(«12») United States Patent
Oohara et al.

(10) Patent No.: US 12,463,298 B2
(45) Date of Patent: Nov. 4, 2025

(54) ELECTRICAL STORAGE DEVICE

(71) Applicant: RUBYCON CORPORATION, Nagano (JP)

(72) Inventors: Kenji Oohara, Nagano (JP); Yuta Ishihara, Nagano (JP); Takashi Nozawa, Nagano (JP); Hibiki Oguchi, Nagano (JP); Ko Nakagawa, Nagano (JP); Akihiko Komatsu, Nagano (JP)

(73) Assignee: RUBYCON CORPORATION, Nagano (JP)

( * ) Notice: Subject to any disclaimer, the term of this patent is extended or adjusted under 35 U.S.C. 154(b) by 589 days.

(21) Appl. No.: 17/996,531

(22) PCT Filed: Apr. 13, 2021

(86) PCT No.: PCT/JP2021/015323
§ 371 (c)(1),
(2) Date: Oct. 19, 2022

(87) PCT Pub. No.: WO2021/215304
PCT Pub. Date: Oct. 28, 2021

(65) Prior Publication Data
US 2023/0207978 A1 Jun. 29, 2023

(30) Foreign Application Priority Data

Apr. 20, 2020 (JP) .................................. 2020-074722
Sep. 30, 2020 (JP) .................................. 2020-166146

(51) Int. Cl.
*H01M 50/533* (2021.01)
*H01G 9/048* (2006.01)
(Continued)

(52) U.S. Cl.
CPC .......... *H01M 50/533* (2021.01); *H01G 9/048* (2013.01); *H01G 9/151* (2013.01);
(Continued)

(58) Field of Classification Search
CPC ............. H01M 50/538; H01M 50/474; H01M 50/533; H01G 9/151; H01G 9/048; H01G 11/26
See application file for complete search history.

(56) References Cited

U.S. PATENT DOCUMENTS 8,320,104 B2 * 11/2012 Fujimoto ............... H01G 9/028
361/511
2006/0221551 A1 * 10/2006 Kim ....................... H01G 11/22
361/502

(Continued)

FOREIGN PATENT DOCUMENTS

JP S59-101433 U 7/1984
JP 2006-278266 A 10/2006
(Continued)

OTHER PUBLICATIONS

International Search Report dated Jun. 29, 2021 for the corresponding patent application No. PCT/JP2021/015323, with English translation.
(Continued)

Primary Examiner — David M Sinclair
(74) Attorney, Agent, or Firm — LUCAS & MERCANTI, LLP

(57) ABSTRACT

Provided is an electrical storage device that is compact and can be manufactured easily, while allowing for use of higher voltages. In an electrical storage device, a winding structure comprises: a central electrode body in which a first extending part and a second extending part extending from either side of a central portion are wound around the central portion in the same direction; a first electrode body electrically connected to a first external terminal and extending toward an outer peripheral side from a vicinity of the central portion; a second electrode body electrically connected to a second external terminal and extending toward the outer
(Continued)

peripheral side from a vicinity of the central portion; a first separator disposed between the central electrode body and the first electrode body; and a second separator disposed between the central electrode body and the second electrode body.

20 Claims, 17 Drawing Sheets

(51) Int. Cl.
*H01G 9/15* (2006.01)
*H01G 11/26* (2013.01)
*H01M 50/474* (2021.01)
*H01M 50/538* (2021.01)

(52) U.S. Cl.
CPC .......... *H01G 11/26* (2013.01); *H01M 50/474* (2021.01); *H01M 50/538* (2021.01)

(56) References Cited

U.S. PATENT DOCUMENTS

| 2007/0115611 A1* | 5/2007 | Fujimoto | ............... H01G 9/151 361/508 |
|---|---|---|---|
| 2010/0073850 A1* | 3/2010 | Fujimoto | ............... H01G 11/52 29/25.03 |

FOREIGN PATENT DOCUMENTS

| JP | 2010-524200 A | 7/2010 |
|---|---|---|
| JP | 2013-149390 A | 8/2013 |
| JP | 2014-013646 A | 1/2014 |
| WO | 2008130042 A2 | 10/2008 |

OTHER PUBLICATIONS

Written Opinion of the International Searching Authority dated Jun. 29, 2021 for the corresponding patent application No. PCT/JP2021/015323, with machine English translation.

* cited by examiner (a)

(b)

(a)

(b)

(a)

(b)

(a)

(b)

ELECTRICAL STORAGE DEVICE

CROSS REFERENCE TO RELATED APPLICATION

This Application is a 371 of PCT/JP2021/015323 filed on Apr. 13, 2021, which claimed the priority of Japanese Patent Application 2020-074722 filed Apr. 20, 2020 and the priority of Japanese Patent Application 2020-166146 filed Sep. 30, 2020, all of which are incorporated herein by reference.

TECHNICAL FIELD

The present invention relates to an electrical storage device, and specifically, to an internal electrode structure of an electrical storage device preferable as an element (capacitor type electrical storage device) having an electrical storage function, such as various capacitors including electrical double layer capacitors and electrolytic capacitors, etc.

BACKGROUND ART

As electrical double layer capacitors and electrolytic capacitors, in recent years, demand for high-voltage products has increased. As high-voltage products, whereas module products having a plurality of cells (electrical storage elements) connected in series (for example, a product including a plurality of elements connected in series via a substrate, a four-terminal type including a plurality of elements which are assembled and terminals of which are caused to directly project, and an internal connection type including a plurality of elements connected internally) have been known, these module products have a large number of components and its manufacturing process is complicated, and there are problems such as increased costs such as the processing cost, insufficient profit margin, and an increase in size.

On the other hand, high-voltage products each configured by a single cell structure disclosed in Patent Documents 1 and 2 listed below are known. Patent Document 1 describes an electrical double layer capacitor including a plurality of cylindrical conductors arranged inward and outward in a radial direction concentrically via separators (refer to FIG. 4). Patent Document 2 discloses a high-voltage super capacitor which has a bipolar element including three or four electrodes including an intermediate electrode not connected to an external terminal, and is configured by winding these electrodes via three or four separators (refer to FIGS. 1 to 3B).

PRIOR ART

Patent Documents

Patent Document 1: Japanese Pre-Grant Utility Model Publication No. 59-101433
Patent Document 2: Japanese Pre-Grant Patent Publication No. 2010-524200

SUMMARY OF INVENTION

Technical Problem

However, in the conventional electrical storage device described in Patent Document 1 described above, when a plurality of electrical storage functional units connected in series are provided inside a single cell structure, it is necessary to arrange a plurality of cylindrical electrical storage functional units concentrically, and this causes problems such that the structure is complicated, manufacturing is difficult, and the number of components constituting each portion increases.

On the other hand, in the conventional electrical storage device described in Patent Document 2 described above, since three or more electrode bodies including an intermediate electrode are wound via the same number of separators, as in the device described in Patent Document 1, the internal electrode structure lacks symmetry, and the number of layers in the winding structure increases, and this causes a problem such that the size tends to increase.

The present invention solves the problems described above, and an object thereof is to realize an electrical storage device which can be made compact and easily manufactured while realizing a higher voltage.

Solution to Problem

In order to solve the problems described above, an electrical storage device according to the present invention includes a winding structure, and a first external terminal and a second external terminal connected to the winding structure, wherein the winding structure includes a band-shaped intermediate electrode body which has a first extending portion and a second extending portion extending from an intermediate portion in an extending direction to both sides of the intermediate portion and being wound around the intermediate portion in the same direction, a first electrode body which is conductively connected to the first external terminal and disposed between the first extending portion positioned at an inner circumferential side and the second extending portion positioned at an outer circumferential side, and extends from the vicinity of the intermediate portion toward the outer circumferential side, a second electrode body which is conductively connected to the second external terminal and disposed between the second extending portion positioned at an inner circumferential side and the first extending portion positioned at an outer circumferential side, and extends from the vicinity of the intermediate portion toward the outer circumferential side, a first separator disposed between the intermediate electrode body and the first electrode body, and a second separator disposed between the intermediate electrode body and the second electrode body.

According to the electrical storage device, the first extending portion and the second extending portion at both sides of the intermediate portion of the band-shaped intermediate electrode body are wound in the same direction, and in one of a pair of gaps in a radial direction between the first extending portion and the second extending portion, the first electrode body is disposed via the first separator, and in the other gap in the radial direction, the second electrode body is disposed via the second separator. By providing the first external terminal conductively connected to the first electrode body and the second external terminal conductively connected to the second electrode body, two electrical storage functional units are configured in series via the intermediate electrode body between the first external terminal and the second external terminal. With this configuration, a first electrical storage functional unit configured by the intermediate electrode body and the first electrode body and a second electrical storage functional unit configured by the intermediate electrode body and the second electrode body are respectively disposed so as to mutually swirl at both sides of the intermediate portion. Accordingly, a higher voltage is realized since at least two electrical storage functional units can be connected in series, and the first electrical storage functional unit and the second electrical storage functional unit are not in a relationship in which one is disposed inward and the other one is disposed outward in a radial direction of the winding structure, but are configured in parallel so as to be respectively along the first extending portion and the second extending portion wound in the same direction on both sides of the intermediate portion. Therefore, the electrical storage device has a simple internal electrode structure, and can be manufactured by developing the conventional technology and winding a laminate of the electrode bodies and the separators, so that manufacturing is easy and the number of components is small, and a compact structure in a radial direction is realized as compared with a conventional method in which three or more electrode bodies are simply wound via three or more separators.

In the present invention, it is preferable that an outer edge portion (side edge) of the intermediate electrode body protrudes further outward than the first electrode body and the second electrode body in the winding structure in an axial direction of the winding structure. According to this, electrical leakage in a radial direction at an outer circumferential portion beyond an outer edge (side edge) of the winding structure in the axial direction can be suppressed by the outer edge portion (side edge) in a width direction of the intermediate electrode body, so that the insulation performance of the device can be improved. In particular, it is further preferable that outer edge portions at both sides (both side edges) of the intermediate electrode body in the width direction protrude further outward than the first electrode body and the second electrode body in the winding structure in the axial direction. In these cases, it is preferable that the winding structure is disposed inside an accommodation space, and the outer edge portion (side edge) of the intermediate electrode body is in contact with an outer boundary of the accommodation space for the winding structure in the axial direction. Accordingly, electrical leakage at an outer circumferential portion in the axial direction inside the accommodation space is further reduced, so that the insulation performance can be further improved. Here, the outer edge portion of the intermediate electrode body is preferably insulative.

It is preferable that an outer edge portion (end edge) of the intermediate electrode body is disposed further outward than the first electrode body and the second electrode body in the winding structure in a radial direction of the winding structure. Accordingly, electrical leakage in a circumferential direction at an outer circumferential portion beyond an outer edge (circumferential edge) of the winding structure in a radial direction can be reduced by the outer edge portion (end edge) of the intermediate electrode body in an extending direction, so that the insulation performance can be improved. In particular, it is further preferable that outer edge portions (both end edges) of the intermediate electrode body at both sides in the extending direction are disposed further outward than the first electrode body and the second electrode body in the winding structure in the radial direction. In these cases, it is preferable that the winding structure is disposed inside an accommodation space, and the outer edge portion (end edge) of the intermediate electrode body is in contact with an outer boundary of the accommodation space for the winding structure in the radial direction. Accordingly, electrical leakage at an outer circumferential portion in the radial direction inside the accommodation space is further reduced, so that the insulation performance can be further improved. Here, the outer edge portion of the intermediate electrode body is preferably insulative.

It is preferable that, when an electrolyte is introduced into the winding structure, at least a portion of the intermediate electrode body sandwiched between the first separator and the second separator does not allow the electrolyte and ions of the electrolyte to pass through. Further, aside from this, it is preferable that, when an electrolyte is introduced into the winding structure, the outer edge portion (side edge or end edge) of the intermediate electrode body is made more difficult to retain the electrolyte or ions of the electrolyte or made more difficult to pass through the electrolyte or ions of the electrolyte than a main body portion of the intermediate electrode body. Accordingly, the separation of the electrolyte at an outer side in the axial direction or the radial direction in the winding structure is further enhanced, so that the insulation performance can be further improved. Here, it is further preferable that the outer edge portion (side edge or end edge) is a portion having properties which do not allow the electrolyte or ions of the electrolyte to pass through. As a result, a leakage current through the electrolyte can be further reliably reduced, and the insulation performance of the device can be further improved.

In the present embodiment, it is preferable that the first extending portion and the second extending portion, and the first electrode body and the second electrode body, are formed to be rotationally symmetric about the intermediate portion. Accordingly, electrical symmetry between the pair of electrical storage functional units configured between the intermediate electrode body and the first electrode body and between the intermediate electrode body and the second electrode body and connected in series can be substantially ensured, so that the durability and the characteristic stability can be improved. In this case, it is preferable that the first separator and the second separator are also formed to be rotationally symmetric about the intermediate portion.

In the present invention, it is preferable that the intermediate electrode body is configured by a plurality of electrode body layers mutually disposed via separator layers. Accordingly, one or more electrical storage functional units are configured between the plurality of electrode body layers, so that a higher voltage can be realized.

In the present invention, it is preferable that the winding structure is structured so that outer circumferential portions of the first electrode body and the second electrode body are covered by outer circumferential portions of the intermediate electrode body from outer circumferential sides in a radial direction. Accordingly, electrical leakage beyond the intermediate electrode body between the first electrode body and the second electrode body can be suppressed, so that the insulation performance can be further improved. In this case, it is preferable that outer circumferential portions of the first separator and the second separator interposed between the intermediate electrode body and the first electrode body and between the intermediate electrode body and the second electrode body are present over wider angle ranges on outer circumferential sides in the radial direction than the first electrode body and the second electrode body.

In the present invention, it is preferable that in one of a pair of inner and outer gaps in a radial direction between the intermediate electrode body and the first electrode body which are respectively provided inward and outward in the radial direction, the first separator is disposed, and in the other gap, an electrically insulating first partition member with electrolyte barrier properties is disposed, and in one of a pair of inner and outer gaps in a radial direction between the intermediate electrode and the second electrode body which are respectively provided inward and outward in the radial direction, the second separator is disposed, and in the other gap, an electrically insulating second partition member with electrolyte barrier properties is disposed. In this case, it is preferable that the first partition member is disposed in a gap at one side of the inner side and the outer side in the radial direction, and the second partition member is disposed in a gap at the same one side as the first partition member.

In this case, it is preferable that the partition members are made of a synthetic resin. The synthetic resin is, for example, polyphenylene sulfide (PPS), polyimide (PI), aramid (wholly aromatic polyamide), polyether ether ketone (PEEK), polyethylene terephthalate (PET), polytetrafluoroethylene (PTFE), polypropylene (PP), polyethylene (PE), etc. As a form of the partition members preferable for constituting the winding structure, the partition members are preferably sheet-shaped. Further, it is preferable that, when an electrolyte is introduced into the winding structure, the partition members do not allow the electrolyte and ions of the electrolyte to pass through. Particularly preferably, the partition members have impermeability and non-retainability of the electrolyte and ions of the electrolyte. For example, the partition members are preferably formed of sheet materials having no voids. As a result, a leakage current through the electrolyte can be further reliably reduced, and the insulation performance of the device can be further improved. From these respects, a preferable sheet material made of a synthetic resin is fluororesin sheets of polytetrafluoroethylene (PTFE), perfluoroalkoxyalkane (PFA), perfluoroethylene propane copolymer (FEP), polyvinylidene fluoride (PVDF), ethylene tetrafluoroethylene copolymer (ETFE), and polychlorotrifluoroethylene (PCTFE), etc. Further, it is preferable that, when the electrolyte is in liquid form, the partition members have a surface having a contact angle of 80 degrees or more to the electrolyte. In particular, the contact angle is preferably larger than 90 degrees (obtuse angle).

In the present invention, it is preferable that outer edge portions of the first partition member and the second partition member respectively protrude further than the intermediate electrode and at least one of the first electrode body and the second electrode body in an axial direction of the winding structure. In this case, it is preferable that, when the winding structure is disposed in an accommodation space, the outer edge portions of the first partition member and the second partition member are respectively in contact with (further preferably, fixed to) outer boundaries of the accommodation space in the axial direction.

In the present invention, it is preferable that outer edge portions of the first partition member and the second partition member are respectively disposed further outward than the intermediate electrode body and at least one of the first electrode body and the second electrode body in the winding structure in a radial direction of the winding structure. In this case, it is preferable that, when the winding structure is disposed in an accommodation space, the outer edge portions of the first partition member and the second partition member are respectively in contact with (preferably, fixed to) outer boundaries of the accommodation space in the radial direction.

In the present invention, an inner edge portion of the first partition member is disposed to extend further to an inner circumferential side than an inner edge portion of the first electrode body, and an inner edge portion of the second partition member is disposed to extend further to an inner circumferential side than an inner edge portion of the second electrode body. Particularly preferably, the inner edge portions of the first partition member and the second partition member are in contact with (further preferably, fixed to) an inner circumferential portion such as the intermediate portion of the intermediate electrode body.

Advantageous Effects of Invention

According to the present invention, an electrical storage device which can be made compact and easily manufactured can be realized while a higher voltage is realized.

DESCRIPTION OF EMBODIMENTS

Figure 1:
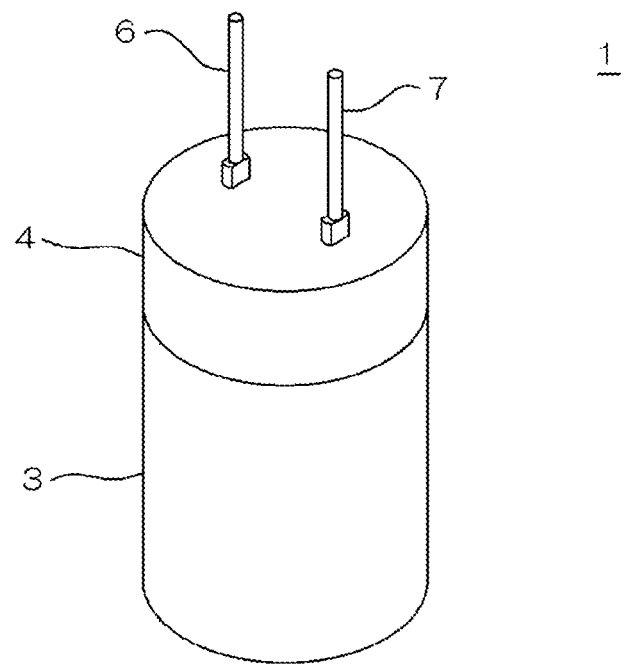
FIG. 1(*a*) is a perspective view schematically illustrating an appearance of a first embodiment of an electrical storage device, and FIG. 1(*b*) is a perspective view schematically illustrating a winding structure inside the device.
Figure 1:
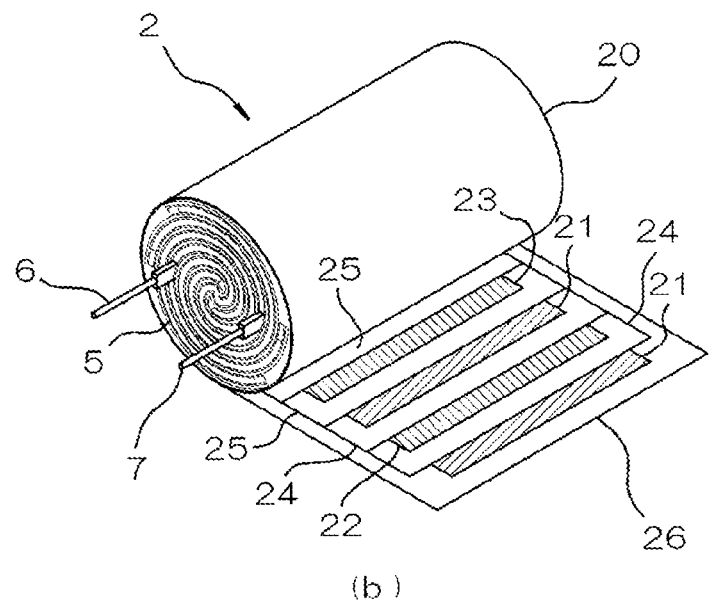

Next, embodiments of the present invention will be described in detail with reference to the accompanying drawings. In the embodiments of the present invention, as an electrical storage device, an electrical double layer capacitor will be described below by way of example. First, with reference to FIG. 1, an entire configuration of a first embodiment of an electrical storage device according to the present invention will be described.

First Embodiment

FIG. 1(a) is a schematic perspective view of an electrical storage device 1 according to the present embodiment, and FIG. 1(b) is a perspective view schematically illustrating a winding type capacitor element 2 to be accommodated inside the electrical storage device 1. The electrical storage device 1 includes a winding type capacitor element 2 configured by introducing (impregnation with) an electrolyte 5 into a winding structure 20 structured by winding band members (sheet materials), a container 3 having a bottomed shape (bottomed cylindrical shape) which accommodates the winding type capacitor element 2, and a sealing body 4 of the container 3. The container 3 can be made of a metal such as aluminum. In the sealing body 4, through holes through which a first external terminal 6 and a second external terminal 7 provided on the winding type capacitor element 2 are inserted are provided. The sealing body 4 leads the first external terminal 6 and the second external terminal 7 to the outside through the through holes while sealing the winding type capacitor element 2 accommodated inside the container 3. The sealing body 4 can be made of various synthetic rubbers and elastomers, etc.

Figure 2:
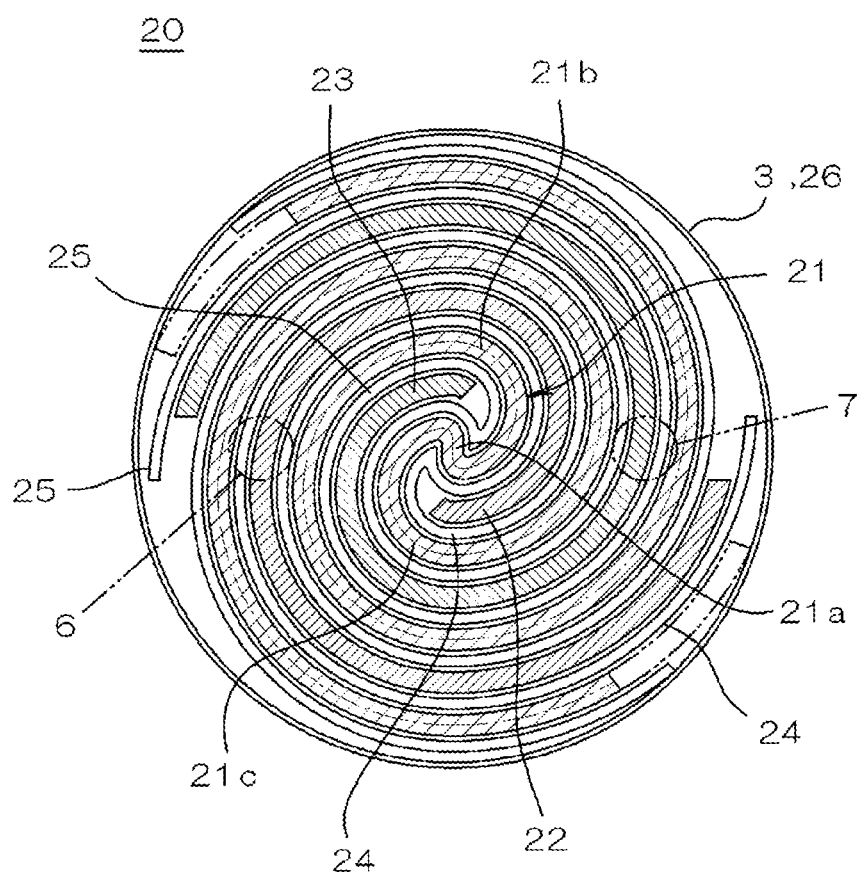
FIG. 2 is a sectional view schematically illustrating a cross-section structure of the winding structure of the first embodiment.

FIG. 2 is a schematic sectional view schematically illustrating a cross section of the winding structure 20. The winding structure 20 has a band-shaped intermediate electrode body 21, and the intermediate electrode body 21 includes a first extending portion 21b and a second extending portion 21c at both sides of an intermediate portion 21a in an extending direction. Both the first extending portion 21b and the second extending portion 21c are respectively wound around the intermediate portion 21a counterclockwise in the illustrated example. On both front and back surfaces of the intermediate electrode body 21, a first separator 24 and a second separator 25 each of which has a band shape are disposed to respectively cover the front and back surfaces of the intermediate electrode body 21.

Focusing on the intermediate portion 21a, in a gap between the first extending portion 21b at an inner circumferential side and the second extending portion 21c at an outer circumferential side, a band-shaped first electrode body 22 is disposed. At this time, between the first extending portion 21b and the first electrode body 22, the above-described first separator 24 is disposed. Between the second extending portion 21c and the first electrode body 22, the above-described first separator 24 is also disposed. On the other hand, between the second extending portion 21c at the inner circumferential side and the first extending portion 21b at an outer circumferential side, a band-shaped second electrode body 23 is disposed. At this time, between the second extending portion 21c and the second electrode body 23, the above-described second separator 25 is disposed. Between the first extending portion 21b and the above-described second electrode body 23, the above-described second separator 25 is also disposed. Both the first separator 24 and the second separator 25 are configured integrally, respectively on the front and back surfaces of the intermediate electrode body 21. That is, each of the first separator 24 and the second separator 25 is continued at a portion adjacent to the intermediate portion 21a, and a portion along the first extending portion 21b and a portion along the second extending portion 21c are configured integrally. Note that, as in other embodiments described later, it is also possible that at least one of the first separator 24 and the second separator 25 separates at the portion adjacent to the intermediate portion 21a, and the portion along the first extending portion 21b and the portion along the second extending portion 21c are configured separately.

In the winding structure 20 described above, the intermediate electrode body 21, the first separator 24, the first electrode 22, the second separator 25, and the second electrode 23 are wound in a manner that they are stacked one on top of the other as in the illustrated example, and are finally retained and fixed in a wound state by a retaining member (for example, a winding stop tape) 26 as an outermost layer. Note that FIG. 2 is just a schematic view and illustrates a form different from an actual wound state, in which, for example, reproducibility of the degree of close contact between the layers is ignored, and in many cases, the number of winds is significantly reduced. A circular shape at the outermost circumference illustrated at an outer side of the structure originally represents a boundary of an accommodation space for the winding structure 20 corresponding to the container 3 or the retaining member 26, that is, a boundary of a space in which the electrolyte 5 may be present in the present embodiment. That is, the illustrated circular shape is schematically shown to define a space having an accommodation function, a shape maintaining function, and an insulating function for the winding structure 20 required according to the circumstances of the winding structure 20 structured as described above. Therefore, the (circular) shape itself has no meaning, and the shape is not limited to this. Further, a pair of circular shapes indicated by the illustrated alternate long and two short dashed lines represent approximate positions of junction portions (tab member forming portions) of the first electrode 22 and the second electrode 23 conductively connected respectively to the first external terminal 6 and the second external terminal 7 illustrated in FIG. 1. Not only FIG. 2 but all of the drawings accompanying the present specification should be understood as schematic views or partially enlarged views, and the shape itself drawn on the drawing does not directly represent a configuration of an actual example. Here, the retaining member 26 does not need to be formed of one member, and may be divided into a plurality of portions. In addition, the retaining member 26 may be formed in a range smaller than one round or in a range not smaller than one round around the axis at the outer circumference of the winding structure 20. Not needing to be formed of one member is true for other members constituting the winding structure 20.

Figure 3:
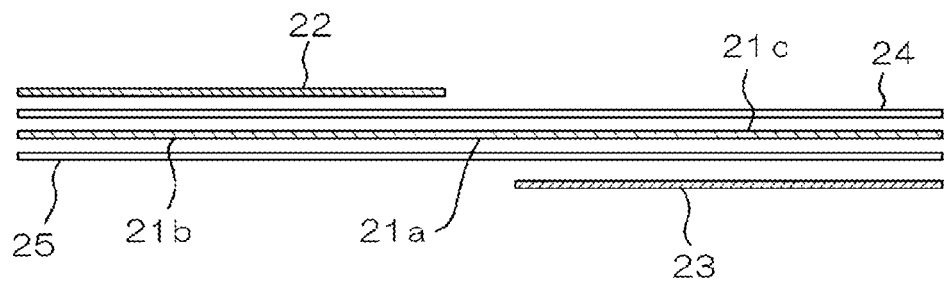
FIG. 3 is an explanatory view schematically illustrating an entire configuration before winding of the winding structure according to the first embodiment.

FIG. 3 schematically illustrates dispositions of the intermediate electrode body 21, the first separator 24, the first electrode 22, the second separator 25, and the second electrode 23 in a developed state. As can be seen from this drawing illustrating a developed state, the first separator 24 is disposed between the intermediate electrode body 21 and the first electrode body 22. The second separator 25 is disposed between the intermediate electrode body 21 and the second electrode body 23.

Figure 4:
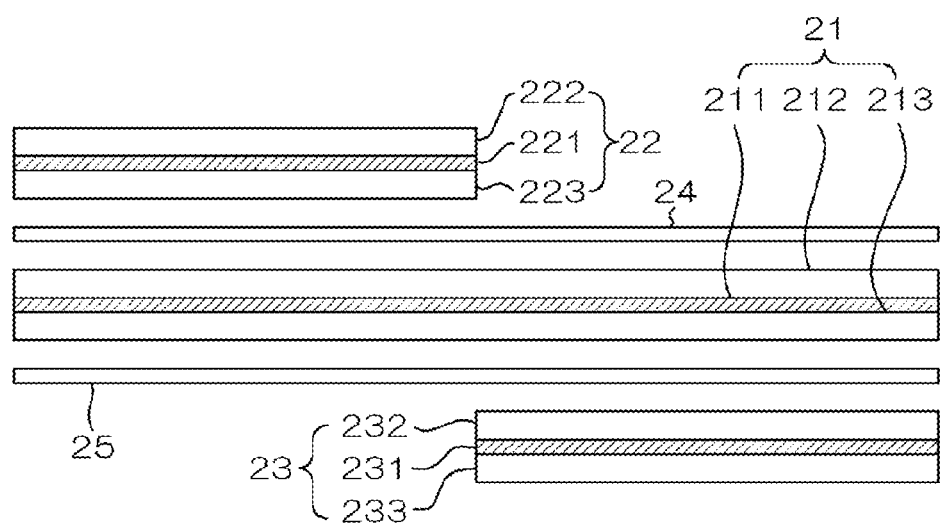
FIG. 4 is an enlarged sectional view schematically illustrating a cross-section structure of each component of the winding structure according to the first embodiment.

FIG. 4 is a sectional view schematically illustrating respective detailed structures of the intermediate electrode body 21, the first separator 24, the first electrode 22, the second separator 25, and the second electrode 23. In the intermediate electrode body 21, a current collector 211 made of metal foil, etc., and polarizable electrode layers 212 and 213 made of a carbon-containing porous material, etc., on both surfaces of the current collector 211 are formed. In the first electrode body 22, a current collector 221 made of metal foil, etc., and polarizable electrode layers 222 and 223 made of a carbon-containing porous material, etc., on both surfaces of the current collector 221 are formed. Further, in the second electrode body 23, a current collector 231 made of metal foil, etc., and polarizable electrode layers 232 and 233 made of a carbon-containing porous material, etc., on both surfaces of the current collector 231 are formed.

As the current collectors 211, 221, and 231, for example, an aluminum foil with a thickness of 20 µm to 50 µm can be used. The polarizable electrode layers 212, 213, 222, 223, 232, and 233 can be configured by, for example, preparing carbon fine particle-containing paste by kneading activated carbon powder and carbon black with a binder, applying the paste on both front and back surfaces of the current collectors 211, 221, and 231 with a thickness of 10 µm to 200 µm, and drying the same. The polarizable electrode layers may be formed not on both surfaces but on one surfaces of the current collectors 211, 221, and 231.

As the first separator 24 and the second separator 25, for example, cellulose nonwoven cloth with a thickness of 20 µm to 100 µm can be used. Other than cellulose nonwoven cloth, nonwoven cloths made of polyimide (PI), aramid (wholly aromatic polyamide), polyether ether ketone (PEEK), polyethylene terephthalate (PET), polytetrafluoroethylene (PTFE), polypropylene (PP), and polyethylene (PE) may be used to form separators. The material of the separators is not limited to the nonwoven cloths described above, and paper made of only cellulose pulp may be used to form the separators.

As the retaining member (winding stop tape) 26, a resin-made adhesive tape of polypropylene (PP), polyphenylene sulfide (PPS), and polyimide (PI), etc., excellent in solvent resistance, heat resistance, and insulation performance, can be used.

As the electrolyte 5 to be introduced into the winding structure 20, various electrolytes required according to the type of the electrical storage device can be used. For example, in the case of the electrical double layer capacitor according to the present embodiment, as cation, tetraethylammonium salt, and as anion, boron tetrafluoride, bis(trifluoromethylsulfonyl)imide, etc., can be used. As an electrolyte in this case, a liquid or gel-like electrolyte can be used. In a case where, as a different capacitor type electrical storage device, for example, an electrolytic capacitor is configured, various electrolytic solutions using boric acid, adipic acid, maleic acid, benzoic acid, phthalic acid, salicylic acid, ammonia, triethylamine, tetramethylammonium hydroxide, etc., as an electrolyte can be used. As the electrolyte 5, solid electrolytes such as manganese dioxide and organic semiconductors, or conductive polymers or other conductive solids (for example, conductive inorganic materials, etc.) can be used.

By disposing non-fluid ion conductors between the intermediate electrode body and the first and second electrode bodies, contact and short-circuiting between the electrodes can be prevented. The non-fluid ion conductor is, for example, a sheet-shaped material obtained by mixing a solid electrolyte in a support material such as a resin, a gel-like electrolyte, or the like. The non-fluid ion conductor described here has a function as a separator to prevent contact and short-circuiting between electrodes while securing ion conductivity.

Figure 5:
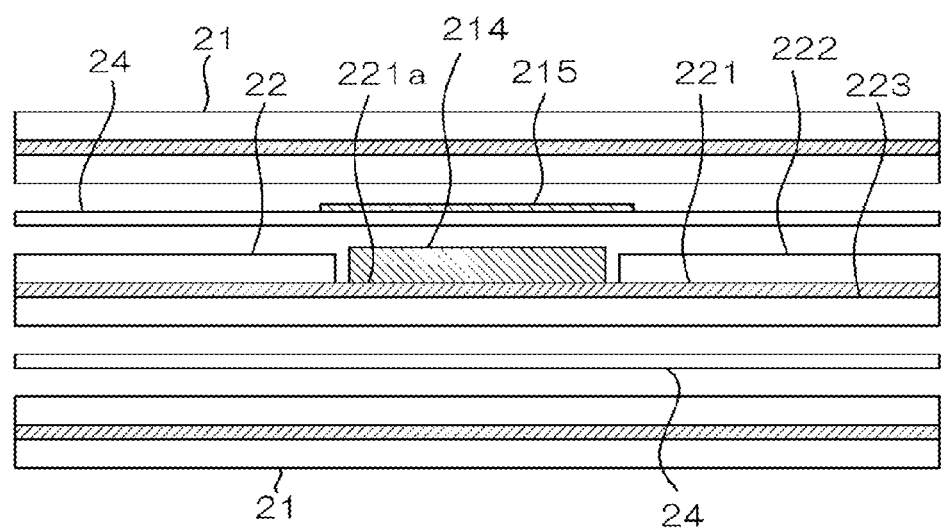
FIG. 5 is an enlarged sectional view schematically illustrating a connection structure of a tab member for external terminal connection in a first electrode body or a second electrode body according to the first embodiment.

FIG. 5 schematically illustrates an example of a conductive connection portion in the first electrode body 22 to the first external terminal 6, and a conductive connection portion in the second electrode body 23 to the second external terminal 7. FIG. 5 illustrates an example of the first electrode body 22 and the first external terminal 6, and the same configuration can apply to the second electrode body 23 and the second external terminal 7. In a portion of the first electrode body 22, as illustrated, a region 221a in which at least one of the polarizable electrode layers 222 and 223 (222 in the illustrated example) is partially removed and the current collector 221 is partially exposed is formed. To this region 221a, a tab member 214 conductively connected to the current collector 221 is joined. The position of this tab member 214 is set in advance together with a forming position of the region 221a so as to be disposed at a predetermined position under circumstances where the winding structure 20 is formed.

In this case, in a gap between the first separator 24 facing the tab member 214 and the intermediate electrode body 21, a protective film 215 having properties which do not allow the electrolyte and ions to pass through and having insulating properties can be disposed. For example, in the illustrated example, the protective film 215 can be stuck onto a surface on the intermediate electrode body 21 side of the first separator 24. Accordingly, the separator is less likely to deteriorate, and the characteristics of the electrical storage device are less likely to deteriorate. As the protective film 215, for example, polyphenylene sulfide (PPS) with a thickness of 1 µm to 200 µm, preferably, 5 µm to 50 µm can be used.

Figure 6:
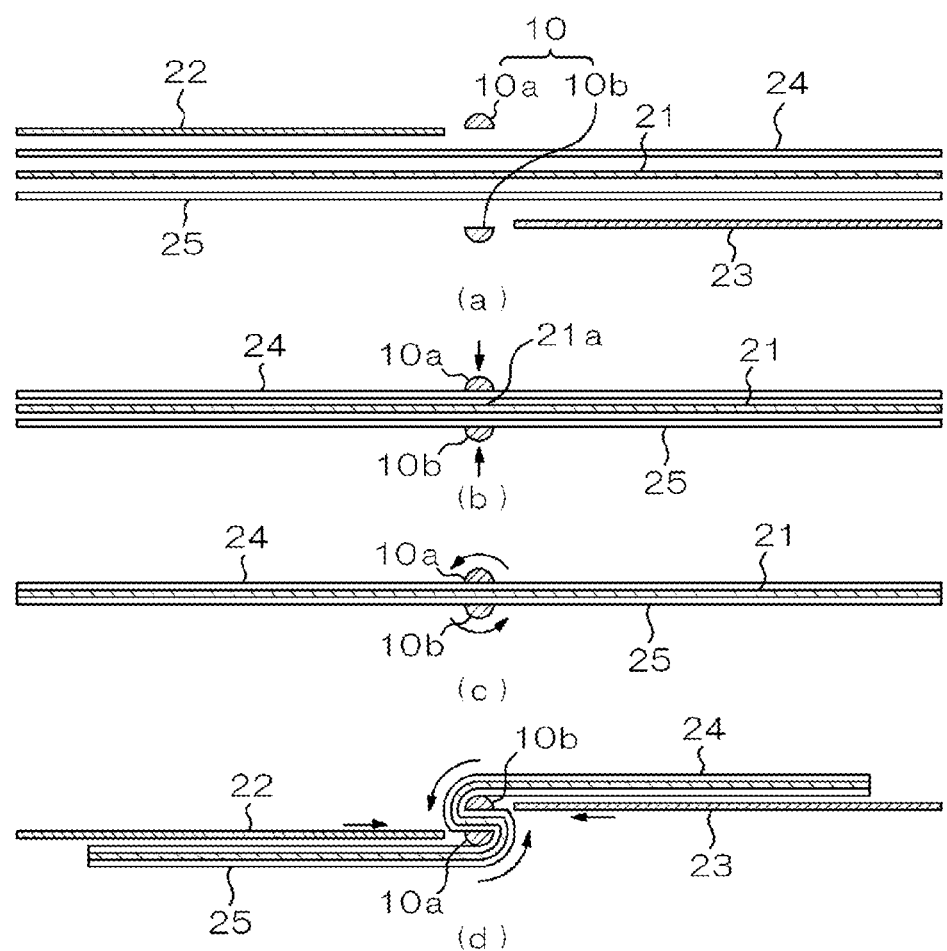
FIGS. 6(*a*) to 6(*d*) are explanatory views schematically illustrating a winding process for forming the winding structure according to the first embodiment.

FIGS. 6(a) to 6(d) are schematic process drawings schematically illustrating a process of forming the winding structure 20. First, as illustrated in FIG. 6(a), between winding core members 10 (a pair of winding cores 10a and 10b) configured to be separable, the intermediate electrode body 21 and the first separator 24 and the second separator 25 to be disposed on both of the front and back surfaces of the intermediate electrode body 21 are disposed. At this time, the intermediate electrode body 21, the first separator 24, and the second separator 25 are held in a manner enabling these to be let out by left and right tape supply systems (supply mechanisms including supply reels, tension rollers, guide rollers, etc., equipped with a rotation resistance providing mechanism, the same applies hereinafter) not illustrated. Then, as illustrated in FIG. 6(b), the intermediate portion 21a of the intermediate electrode body 21 and intermediate portions of the first separator 24 and the second separator 25 are sandwiched between the pair of winding cores 10a and 10b, and by rotating the winding core members 10 as illustrated in FIG. 6(c), the intermediate electrode body 21, the first separator 24, and the second separator 25 can be wound around the intermediate portion 21a sandwiched between the winding core members 10 as illustrated in FIG. 6(d). At this time, each of the electrode bodies is let out by the left and right tape supply systems, etc., not illustrated according to rotations of the winding core members 10 so that the first electrode body 22 is rolled in the first separator 24 and the second electrode body 23 is rolled in the second separator 25. Last, the retaining member (winding stop tape) 26 is fitted (attached) to the outermost layer to retain the wound state.

When the winding structure 20 is formed as described above, the first external terminal 6 and the second external terminal 7 are respectively joined to the corresponding tab members 214 and, in the conductively connected state, inserted through the through holes of the sealing body 4. Then, in a state where the winding structure 20 is impregnated with, for example, an electrolytic solution as the electrolyte 5, the winding structure 20 is accommodated in the container 3, and last, an opening of the container 3 is sealed by the sealing body 4.

Figure 7:
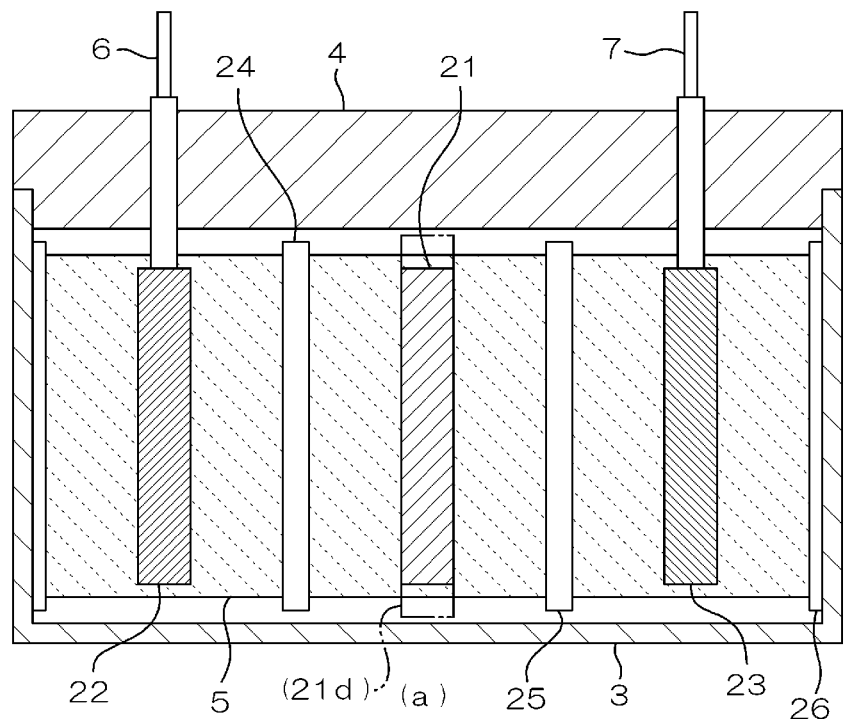
FIG. 7(*a*) is an explanatory sectional view schematically illustrating a cross-section structure of an accommodation structure in a radial direction inside a container of the winding structure according to the first embodiment, and FIG. 7(*b*) is an explanatory sectional view schematically illustrating a cross-section structure in a circumferential direction.
Figure 7:
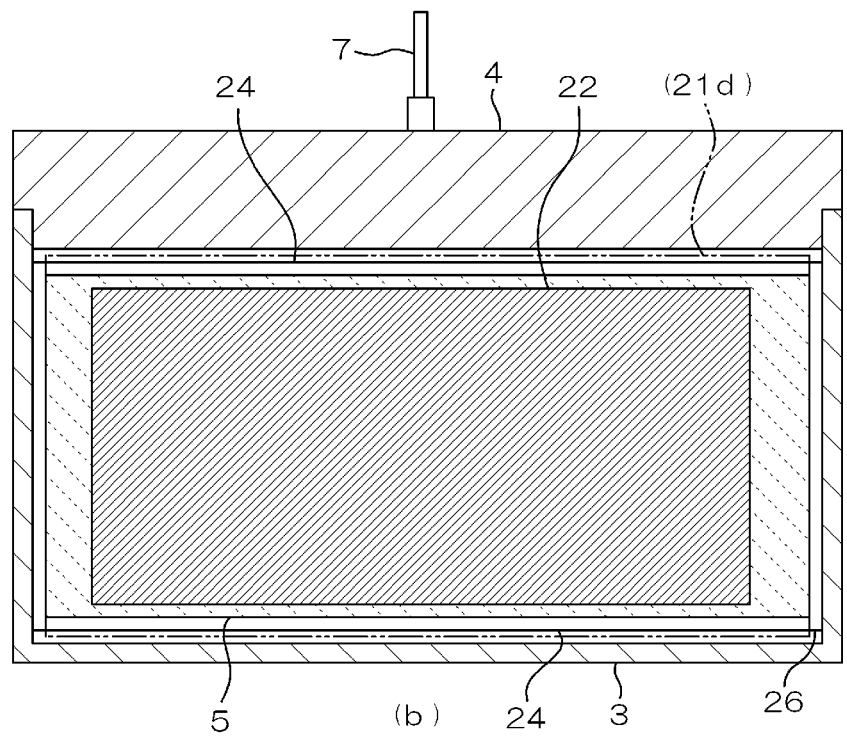

FIGS. 7(a) and 7(b) are schematic configuration sectional views schematically illustrating an entire configuration of the electrical storage device 1 according to the present embodiment, formed as described above. Here, FIG. 7(a) schematically illustrates a relative positional relationship in a radial direction of the winding structure 20 (internal electrode structure) of the electrical storage device 1, and FIG. 7(b) schematically illustrates a relative positional relationship around an axis (circumferential direction) of the winding structure 20 (internal electrode structure) of the electrical storage device 1. As illustrated in FIGS. 7, inside the electrical storage device 1 (cell structure), in a region into which the electrolyte 5 is introduced (region impregnated with the electrolyte 5), a first electrical storage functional unit configured by a portion where the intermediate electrode body 21 and the first electrode body 22 face each other via the first separator 24, and a second electrical storage functional unit configured by a portion where the intermediate electrode body 21 and the second electrode body 23 face each other via the second separator 25, are provided. These two electrical storage functional units are connected in series to each other between the first external terminal 6 and the second external terminal 7, so that a voltage about two times as high as a voltage in the case of a cell structure including only a single electrical storage functional unit can be obtained. The present embodiment is an electrical double layer capacitor which stores electric charges by using electrical double layers generated in interfaces between the electrodes 21, 22, and 23 and the electrolyte 5 as dielectric bodies, and the serial structure described above also applies to electrolytic capacitors and other capacitors.

In the first embodiment described above, as illustrated in FIG. 2, the first extending portion 21b and the second extending portion 21c on both sides of the intermediate portion 21a of the band-shaped intermediate electrode body 21 are wound in the same direction, and in one of a pair of gaps in a radial direction between the first extending portion 21b and the second extending portion 21c, the first electrode body 22 is disposed via the first separator 24, and in the other one of the pair of gaps in the radial direction, the second electrode body 23 is disposed via the second separator 25. Then, by providing the first external terminal 6 conductively connected to the first electrode body 22 and the second external terminal 7 conductively connected to the second electrode body 23, two electrical storage functional units are configured in series via the intermediate electrode body 21 between the first external terminal 6 and the second external terminal 7. At this time, the first electrical storage functional unit configured by the intermediate electrode body 21 and the first electrode body 22 and the second electrical storage functional unit configured by the intermediate electrode body 21 and the second electrode body 23 are configured not to overlap inward and outward in the radial direction, so that the first electrical storage functional unit and the second electrical functional unit are not in a relationship in which one is disposed inward and the other is disposed outward as viewed in a radial direction. That is, in the winding structure 20 according to the present embodiment, by alternately disposing or disposing in parallel the first electrode body 22 and the second electrode body 23 in an angle range around the intermediate portion 21a, a bias in structural symmetry in the radial direction can be reduced. In addition, the first electrode body 22 and the second electrode body 23 are configured so as to be respectively along the first extending portion 21b and the second extending portion 21c which are wound in the same direction at both sides of the intermediate portion 21a, and therefore, although a different winding method is used, the device can be manufactured by developing the conventional technology and winding a laminate of the electrode bodies and separators, so that manufacturing is easy and the number of components is small.

In the present embodiment, as illustrated in FIG. 2, it is preferable that the first extending portion 21b and the second extending portion 21c, and the first electrode body 22 and the second electrode body 23, are formed to be rotationally symmetrical to each other about the intermediate portion 21a of the intermediate electrode body 21. Accordingly, the first electrical storage functional unit and the second electrical storage functional unit have structures substantially equivalent to each other, so that electrical symmetry between the pair of electrical storage functional units configured between the intermediate electrode body 21 and the first electrode body 22 and between the intermediate electrode body 21 and the second electrode body 23 and connected in series can be substantially ensured. With the configuration described above, a bias of an applied voltage, etc., can be reduced, so that the durability and characteristic stability of the electrical storage device can be improved.

More specifically, in Patent Document 1 and Patent Document 2, due to a structural problem in which the plurality of electrical storage functional units are different in disposition in a radial direction and dimensions, their characteristic differences become large and easily cause problems in durability and characteristic stability. For example, when a leakage current between the electrical storage functional units increases, due to an influence from self-discharge, variation in voltage increases as a voltage application time passes. Accordingly, in an electrical storage functional unit with a smaller leakage current, there is a risk that the voltage increases as the voltage application time passes, and finally rises to a decomposition voltage of the solvent and causes a problem such as gas generation and increased resistance. When a plurality of electrical storage functional units are sealed in one container, a leakage current may increase due to short-circuiting between electrodes caused by an electrolyte. This increase in leakage current becomes a factor which further deteriorates the durability and characteristic stability described above.

On the other hand, with the electrical storage device according to the present embodiment, the first electrical storage functional unit configured by the intermediate electrode body 21 and the first electrode body 22 and the second electrical storage functional unit configured by the intermediate electrode body 21 and the second electrode body 23 are respectively disposed in parallel in mutually swirling forms at both sides of the intermediate portion 21a, so that the first electrical storage functional unit and the second electrical storage functional unit can be easily uniformized and balanced in characteristics. In particular, by configuring the intermediate electrode body 21, the first electrode body 22 and the second electrode body 23 rotationally symmetrically to each other about the intermediate portion 21a as described above, the units can be balanced in characteristics, and as a result, it becomes difficult for the voltage to concentrate on one side, and the durability and characteristic stability are significantly improved. In this case, a configuration in which the first separator 24 and the second separator 25 are also formed to be rotationally symmetrical to each other is more effective.

Although FIG. 7 illustrate a state where an outer circumferential portion of the winding structure 20 is covered by the retaining member 26, and an inner surface of the container 3 is disposed on an outer side of the retaining member 26, FIG. 7 illustrate only a schematic configuration, and even when the outer circumferential portion is configured as illustrated, this configuration is just an example. For example, unlike the illustrated configuration, a gap may be provided between the container 3 and the electrolyte 5, and an insulating coating may be applied onto the inner surface of the container 3. Since FIG. 7 are schematic views, in FIGS. 7, the first separator 24, the second separator 25, and the intermediate electrode body 21 are illustrated as though they are not disposed outward of the first electrode body 22 and the second electrode body 23 in a radial direction in a form which does not match the cross-section structure illustrated in FIG. 2. However, this configuration of the outer circumferential portion can also be regarded as a configuration in which the first separator 24 is disposed outward of the first electrode 22 in a radial direction, and/or the second separator 25 is disposed outward of the second electrode body 23 in a radial direction so as to correspond to the cross-section structure illustrated in FIG. 2, or regarded as a configuration in which the intermediate electrode body 21 is disposed further outward of the separators 24 and 25 in a radial direction.

Second Embodiment

Figure 8:
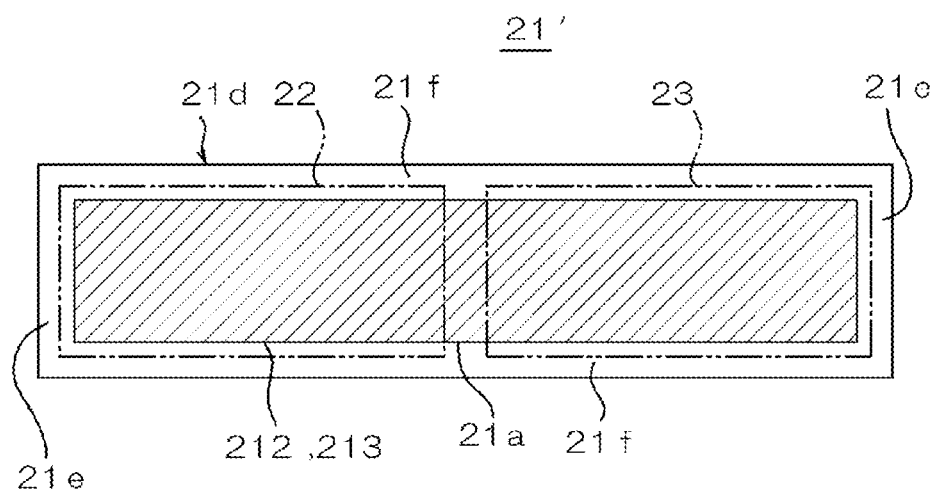
FIG. 8(*a*) is a plan view schematically illustrating a developed state of an intermediate electrode body according to a second embodiment, and FIG. 8(*b*) is a perspective view schematically illustrating a winding structure.
Figure 8:
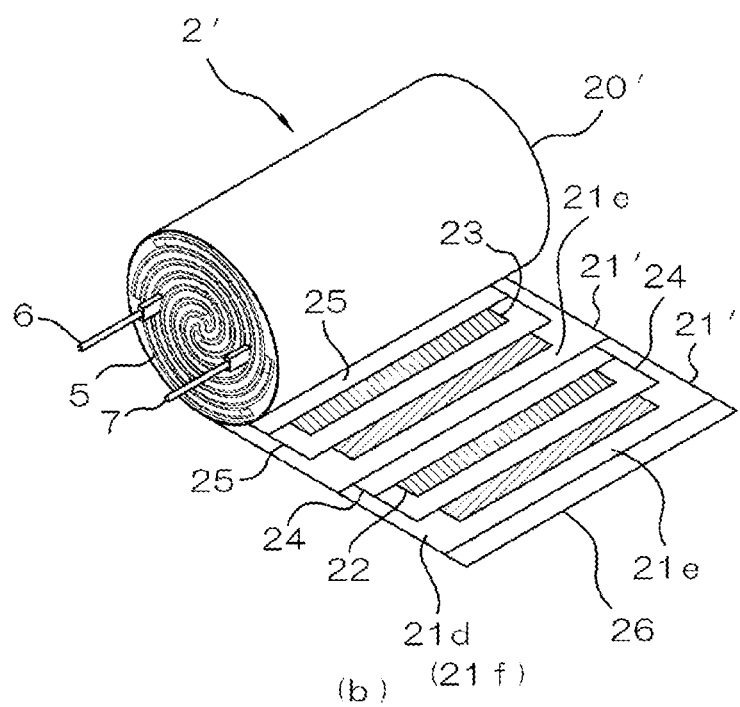

Next, an electrical storage device according to a second embodiment of the present invention will be described with reference to FIGS. 8 to 10. In this second embodiment, components other than a winding type capacitor element 2' are the same as in the first embodiment, and an entire configuration of a winding structure 20' illustrated in FIG. 8 and a general cross-section structure of the winding structure 20' illustrated in FIG. 10 can also be made in basically the same manner as those of the winding structure 20, so that portions which can be configured in the same manner are provided with the same reference signs, and description thereof will be omitted.

In the second embodiment, as illustrated in FIG. 8(a), in an outer edge portion 21d of an intermediate electrode body 21', side edges 21f as outer edge portions in a width direction are configured to protrude further outward than the first electrode body 22 and the second electrode body 23 in an axial direction of the winding structure 20' (refer to FIG. 9(a)). Here, it is more preferable that the side edges 21f are disposed at the same positions in the axial direction as outer edge positions of the first separator 24 and the second separator 25, or are configured to protrude further outward than the outer edge positions in the axial direction. Unlike the present embodiment, regardless of the relationships with the first electrode body 22 and the second electrode body 23, a configuration in which the side edges 21f are disposed at the same positions in the axial direction as the outer edge positions of the first separator 24 and the second separator 25 or configured to protrude further outward than the outer edge positions in the axial direction also enhances the separation of the electrolyte and is effective in reducing a leakage current between the pair of electrical storage functional units.

Figure 10:
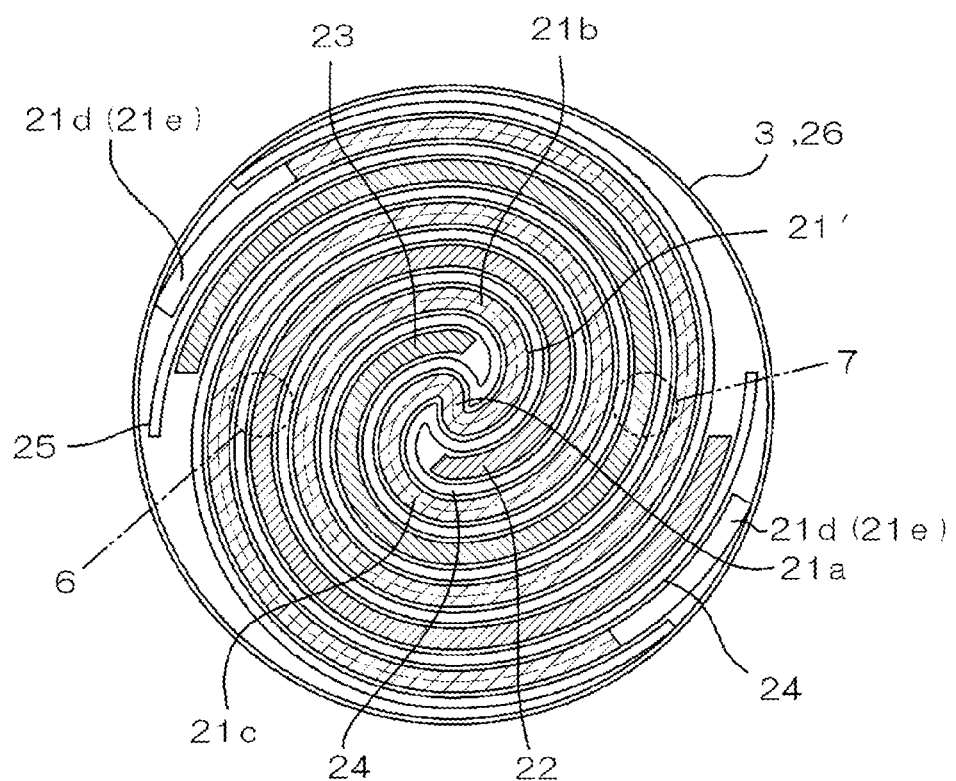
FIG. 10 is a schematic sectional view schematically illustrating a cross-section structure of the winding structure according to the second embodiment.

In the outer edge portion 21d of the intermediate electrode body 21', end edges 21e as outer edge portions in an extending direction are configured to be disposed further outward than the first electrode body 22 and the second electrode body 23 in a radial direction of the winding structure 20' (refer to FIG. 10). Here, it is more preferable that the end edges 21e are disposed at the same positions in a radial direction as the outer edge positions of the first separator 24 and the second separator 25, or disposed further outward than the outer edge positions in the radial direction. Unlike the present embodiment, regardless of the relationships with the first electrode body 22 and the second electrode body 23, a configuration in which the end edges 21e are disposed at the same positions in a radial direction as the outer edge positions of the first separator 24 and the second separator 25 or disposed further outward than the outer edge positions in the radial direction also enhances the separation of the electrolyte and is effective in reducing a leakage current between the pair of electrical storage functional units.

The alternate long and two short dashed lines illustrated in FIG. 8(a) represent outer edges of the first electrode body 22 and the second electrode body 23. These outer edges indicate positions as references to indicate relative positional relationships of the end edges 21e and the side edges 21f in the outer edge portion 21d of the intermediate electrode body 21' in the winding structure 20'. These will be described later in further detail. In the illustrated example, the outer edge portion 21d of the intermediate electrode body 21' is formed into a frame shape outward of the polarizable electrode layers 212 and 213 of the intermediate electrode body 21'. The end edges 21e and the side edges 21f are formed on both sides in the extending direction and the width direction.

In the present embodiment, the outer edge portion 21d is formed outward of a main body portion formed of an electrode region including the current collector 211 and the polarizable electrode layers 212 and 213. Although not particularly limited, the outer edge portion 21d is preferably configured by a portion which makes it difficult to retain the electrolyte 5 and/or ions of the electrolyte 5, or makes it difficult to allow the electrolyte 5 and/or ions of the electrolyte 5 to pass through as compared with the main body portion (the above-described laminated structure of the current collector 211 and the polarizable electrode layers 212 and 213) constituting the intermediate electrode body 21'. For example, the outer edge portion 21d can be configured by extending a portion which makes it difficult to retain the electrolyte 5 and/or ions of the electrolyte 5 or a portion which makes it difficult to allow the electrolyte 5 and/or ions of the electrolyte 5 to pass through as compared with the (porous) polarizable electrode layers 212 and 213 which easily retain the electrolyte 5 and/or ions of the electrolyte 5. For example, the outer edge portion 21d can be configured by a sheet, film, tape or the like made of a synthetic resin described later. The outer edge portion 21*d* can also be configured by the current collector 211 exposed by not forming or by peeling off the polarizable electrode layers 212 and 213 which easily retain the electrolyte 5 and/or ions of the electrolyte 5. Further, for example, it is also possible that, while the outer edge portion 21*d* has the same structure as the laminated structure of the current collector 211 and the polarizable electrode layers 212 and 213 of the main body portion, the outer edge portion 21*d* is a portion where the current collector 211 as a core member is thick or the polarizable electrode layers 212 and 213 are thin as compared with the main body portion, that is, a portion which is less likely to retain the electrolyte 5 and/or ions of the electrolyte 5 or is less likely to allow the electrolyte 5 and/or ions of the electrolyte 5 to pass through as compared with the main body portion. This outer edge portion 21*d* is provided to reduce electrical leakage at an outer circumferential portion on an outer side of the winding structure 20'. In the present embodiment, the outer edge portion 21*d* is provided particularly to enhance the separation of the electrolyte 5 introduced into the winding structure 20' and ions of the electrolyte 5 between the first electrode body 22 side and the second electrode body 23 side.

By making the outer edge portion 21*d* (the end edges 21*e* and the side edges 21*f*) of an insulating material, the periphery of the intermediate electrode body 21' can be covered by the insulating material, so that internal conduction between the first electrode body 22 and the second electrode body 23 can be suppressed and the insulation performance can be improved, and the leakage current can be more effectively reduced. As the different-characteristic edge portion 21*d* having such insulation properties, a sheet, a film, a tape, or the like made of polyphenylene sulfide (PPS), polyimide (PI), aramid (wholly aromatic polyamide), polyether ether ketone (PEEK), polyethylene terephthalate (PET), polytetrafluoroethylene (PTFE), polypropylene (PP), or polyethylene (PE) can be used. These materials have properties which do not allow the electrolyte 5 and ions to pass through in addition to the insulation properties, and realizes an improvement in characteristics of the electrical storage device (insulation performance) including reducing leakage current.

Figure 9:
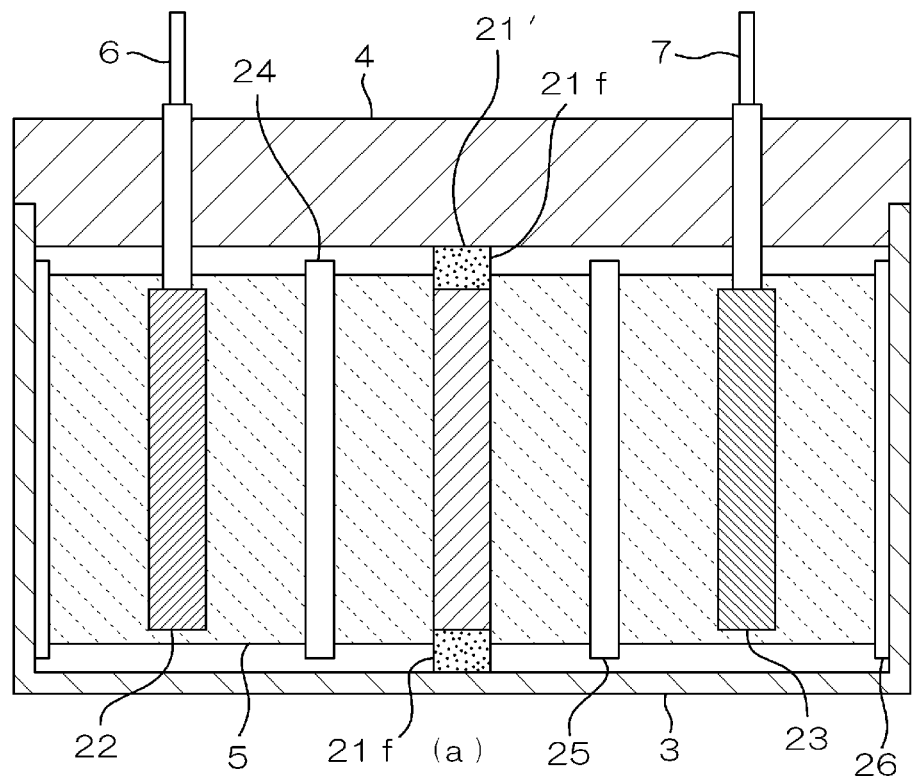
FIG. 9(*a*) is an explanatory view schematically illustrating a cross-section structure of an accommodation structure in a radial direction inside a container of the winding structure according to the second embodiment, and FIG. 9(*b*) is an explanatory sectional view schematically illustrating a cross-section structure in a circumferential direction.
Figure 9:
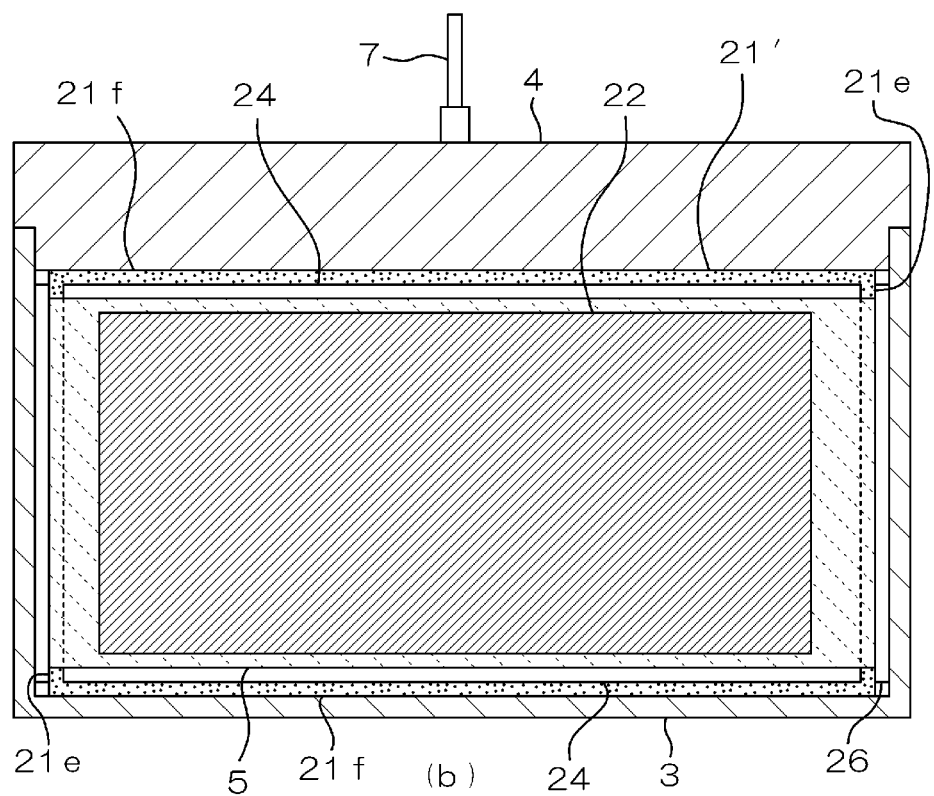

FIG. 9(*a*) is a view schematically illustrating a relative positional relationship in a radial direction of an internal electrode structure of the electrical storage device 1 according to the second embodiment, and FIG. 9(*b*) is a view schematically illustrating a relative positional relationship around an axis of the electrode structure of the electrical storage device, in comparison with FIG. 7 illustrating the first embodiment. As seen in these drawings, it is clear that, due to the side edges 21*f* of the outer edge portion 21*d*, the electrolyte 5 is easily separated in a radial direction of the winding structure 20', so that deterioration in insulation performance through the electrolyte 5 is suppressed. In particular, as illustrated, the side edges 21*f* are in contact with an inner surface of the container 3 or the retaining member 26 disposed inside the container 3, or the sealing body 4 or a sealing resin, etc., (boundaries of the accommodation space for the winding structure 20', that is, in the present embodiment, boundaries of a space in which the electrolyte 5 may be present). In this way, due to the contact of the side edges 21*f* with the outer boundaries of the accommodation space for the winding structure 20' in the axial direction, the accommodation space is substantially separated in a radial direction of the winding structure 20', so that the insulation performance can be further improved.

In particular, the electrolyte 5 easily pools at outer sides (particularly, a bottom portion) of the winding structure 20' in the axial direction, so that the side edges 21*f* are effective in separating the electrolyte 5. Here, in the intermediate electrode body 21' in the illustrated example, although side edges 21*f* are provided on both sides in a width direction, the side edge 21*f* may be provided on one side. As a matter of course, as in the illustrated example, the configuration in which the pair of side edges 21*f* at both sides in the width direction protrude or are in contact with the boundaries described above (the above-described inner surface, etc.) is more effective.

As illustrated in FIG. 10, in the winding structure 20', the end edges 21*e* of the outer edge portion 21*d* are disposed further outward than the first electrode body 22 and the second electrode body 23 and the first separator 24 and the second separator 25 in a radial direction of the winding structure 20'. This outer circumferential disposition of the end edges 21*e* further enhances the separation of the electrolyte 5 in the circumferential direction in the winding structure 20' as illustrated in FIG. 10. In particular, as illustrated, it is clear that the contact of the end edges 21*e* with an inner surface of the container 3 or the retaining member 26 disposed inside the container 3 or the sealing body 4 or a sealing resin, etc., (boundaries of an accommodation space for the winding structure 20', that is, in the present embodiment, boundaries of a space in which the electrolyte 5 may be present) at the outer sides (outer circumferential sides) of the winding structure 20' in a radial direction further enhances the separation of the electrolyte 5 in the circumferential direction. Here, as illustrated in FIGS. 8, although the end edges 21*e* are provided on both sides of the intermediate electrode body 21' in the extending direction, the end edge 21*e* may be provided on one side. As a matter of course, as in the illustrated example, the configuration in which the pair of end edges 21*e* on both sides of the intermediate electrode body 21' in the extending direction are disposed at the outer circumferential portion, or are in contact with the boundaries described above (the above-described inner surface, etc.) is more effective.

In the present embodiment, in the illustrated example, the outer edge portion 21*d* of the intermediate electrode body 21' including the side edges 21*f* illustrated in FIG. 9 and the end edges 21*e* illustrated in FIG. 10 is configured by using a structure and/or a material different from those of the main body portion. However, even when the intermediate electrode body 21 is entirely formed of a uniform structure and/or a uniform material as in the first embodiment, by disposing the outer edge portion of the intermediate electrode body 20 so that the end edges indicated by the alternate long and two short dashed lines in FIG. 2 are disposed at outer circumferential portions in a radial direction and the side edges indicated by the alternate long and two short dashed lines in FIG. 7 protrude in the axial direction, the leakage current is reduced and the insulation performance is improved. In this case, when a portion having a material or a structure highly effective in separating the electrolyte 5, such as the current collector 211 used as a core member of the intermediate electrode body 20, reaches end faces of the outer edge portion 21*d* (the end edges 21*e* or the side edges 21*f*) and is exposed to the end faces of the outer edge portion 21*d*, an effect to reduce the leakage current can be further preferably obtained. In particular, when this portion is configured to be thick relative to a surface layer portion such as the polarizable electrode layer, the separation of this portion from the electrolyte 5 is also enhanced, and this is more effective. The point that the side edges of the intermediate electrode body 20 configured to be in contact with outer boundaries of the accommodation space in the axial direction, and the end edges configured to be in contact with outer boundaries of the accommodation space in a radial direction, are further preferable is the same as in the present embodiment.

In the present embodiment, as illustrated in FIG. 9(a), in the outer edge portion 21d of the intermediate electrode body 21', the side edges 21f which are outer edge portions in the width direction are disposed further outward than the first electrode body 22, the second electrode body 23 and the first separator 24 and the second separator 25 in the axial direction. However, as long as the side edges 21f protrude further outward than at least one of the first electrode body 22 and the second electrode body 23 in the axial direction of the winding structure 20', the leakage current between the pair of electrical storage functional units is reduced, and this configuration is considered to be effective in improving the insulation performance. In addition, as long as the side edges 21f protrude further outward than at least one of the first separator 24 and the second separator 25 in the axial direction of the winding structure 20', the leakage current between the pair of electrical storage functional units is reduced, and this configuration is considered to be effective in improving the insulation performance.

In the present embodiment, as illustrated in FIG. 10, in the outer edge portion 21d of the intermediate electrode body 21', end edges 21e which are outer edge portions in the extending direction are disposed further outward than the first electrode body 22 and the second electrode body 23 in a radial direction of the winding structure 20'. However, as long as the end edges 21e are disposed further outward than at least one of the first electrode body 22 and the second electrode body 23 in the radial direction of the winding structure 20', the separation between the pair of electrical storage functional units can be enhanced, and this configuration is considered to be effective in improving the insulation performance. In addition, as long as the end edges 21e are disposed further outward than at least one of the first separator 24 and the second separator 25 in the radial direction of the winding structure 20', the separation between the pair of electrical storage functional units can be enhanced, so that this configuration is considered to be effective in improving the insulation performance.

When at least any one of the intermediate electrode body 21', the first electrode body 22, and the second electrode body 23 is in contact with a boundary of the accommodation space (the above-described inner surface, etc.), this boundary (the above-described inner surface, etc.) preferably has insulation properties. However, the boundary (the above-described inner surface, etc.) is allowed to be conductive as long as all of contact of a plurality of different electrode bodies with the same member constituting the boundary, contact of the first electrode body 22 and the electrolyte in the second electrical storage functional unit with the same member constituting the boundary, and contact of the second electrode body 23 and the electrolyte in the first electrical storage functional unit with the same member constituting the boundary, are avoided.

Third Embodiment

Next, an electrical storage device according to a third embodiment of the present invention will be described with reference to FIG. 11. In this embodiment, components other than a first separator 24' and a second separator 25' can be configured in the same manner as in the first embodiment or second embodiment, so that portions which can be configured in the same manner are provided with the same reference signs, and description thereof will be omitted. In the present embodiment, by providing a missing portion 24a' adjacent to the vicinity of the intermediate portion 21a of the intermediate electrode body 21, the first separator 24' is formed of divisions consisting of a separator portion 24b' along the first extending portion 21b and a separator portion 24c' along the second extending portion 21c. In addition, by providing a missing portion 25a' adjacent to the vicinity of the intermediate portion 21a of the intermediate electrode body 21, the second separator 25' is formed of divisions consisting of a separator portion 25b' along the first extending portion 21b and a separator portion 25c' along the second extending portion 21c.

Even with the configuration described above, no problem occurs as long as insulation between the intermediate electrode body 21 and the first electrode body 22 and insulation between the intermediate electrode body 21 and the second electrode body 23 are ensured. In this case, even when the missing portions 24a' and 25a' are provided, the insulation performance is ensured as long as inner end portions of the respective separator portions 24b', 24c', 25b', and 25c' are disposed closer to the center side (the intermediate portion 21a side) than inner end portions of the first electrode body 22 and the second electrode body 23, that is, inner end side portions of the first separator 24b' and the second separator 25' are provided over angle ranges beyond the inner end portions of the first electrode 22 and the second electrode body 23. Insulating materials using the same structure and material as those of the different-characteristic edge portion 21d having insulation properties described above may be disposed at inner ends of the first electrode body 22 and the second electrode body 23, and extending portions of the insulating materials may be formed.

Figure 11:
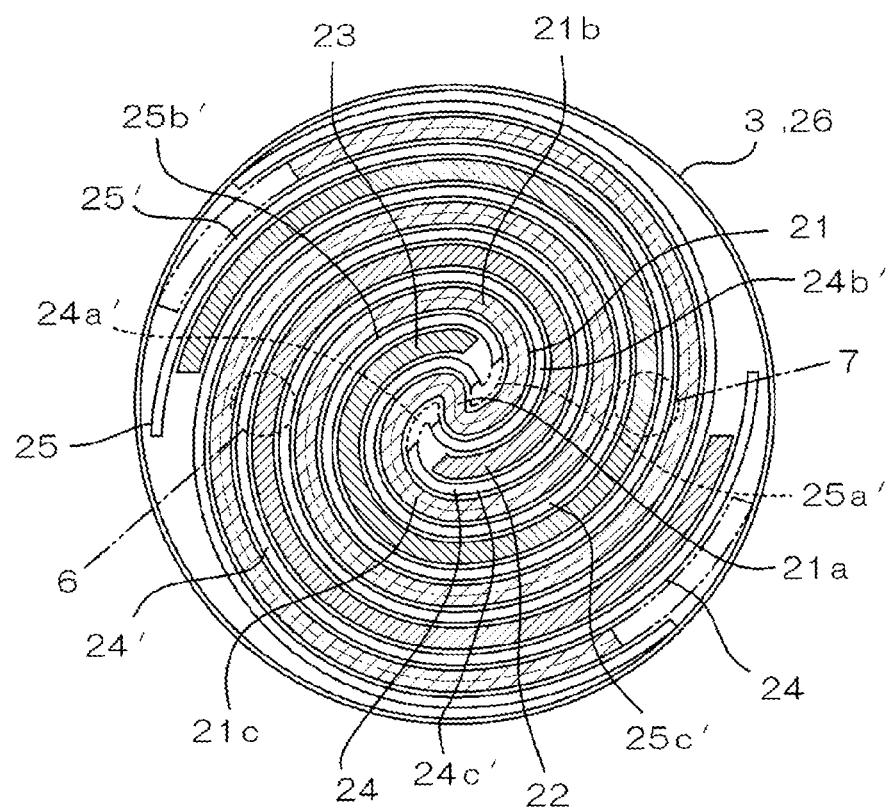
FIG. 11 is a schematic sectional view schematically illustrating a cross-section structure of a winding structure according to a third embodiment.

As indicated by alternate long and two short dashed lines in FIG. 11, by causing outer edge portions (side edges) of the intermediate electrode body 20 to protrude outward in the axial direction of the winding structure 20, and/or by disposing outer edge portions (end edges) outward in the radial direction of the winding structure 20, the leakage current can be reduced and the insulation performance can be improved. In these cases, it is further preferable that the outer edge portions are brought into contact with outer boundaries (the above-described inner surface, etc.) of the accommodation space for the winding structure 20 in the axial direction and/or the radial direction.

Fourth Embodiment

Next, an electrical storage device according to a fourth embodiment of the present invention will be described with reference to FIG. 12. In this embodiment, components other than the intermediate electrode body 21, the first separator 24, and the second separator 25 can be configured in the same manner as in the first to third embodiments, so that portions which can be configured in the same manner are provided with the same reference signs, and description thereof will be omitted. In the present embodiment, by providing adhesive layers 27 and 28 between the intermediate electrode body 21 and the first separator 24 and between the intermediate electrode body 21 and the second separator 25, the intermediate electrode body 21, the first separator 24, and the second separator 25 are configured integrally, and the intermediate electrode body 21, the first separator 24, and the second separator 25 integrated in this way are wound as described above together with the first electrode body 22 and the second electrode body 23, and accordingly, the winding structure 20 is formed. Here, the adhesive layers 27 and 28 can be made of various bonds and adhesives. With this configuration, the winding process is facilitated, and a winding form of the winding structure can be formed in an orderly manner with high reproducibility. In the illustrated example described above, although the intermediate electrode body 21, the first separator 24, and the second separator 25 are configured integrally, for example, along with or instead of the configuration described above, a configuration in which the first separator 24 and the first electrode body 22 are integrated, and/or a configuration in which the second separator 25 and the second electrode body 25 are integrated, may be employed.

Figure 12:
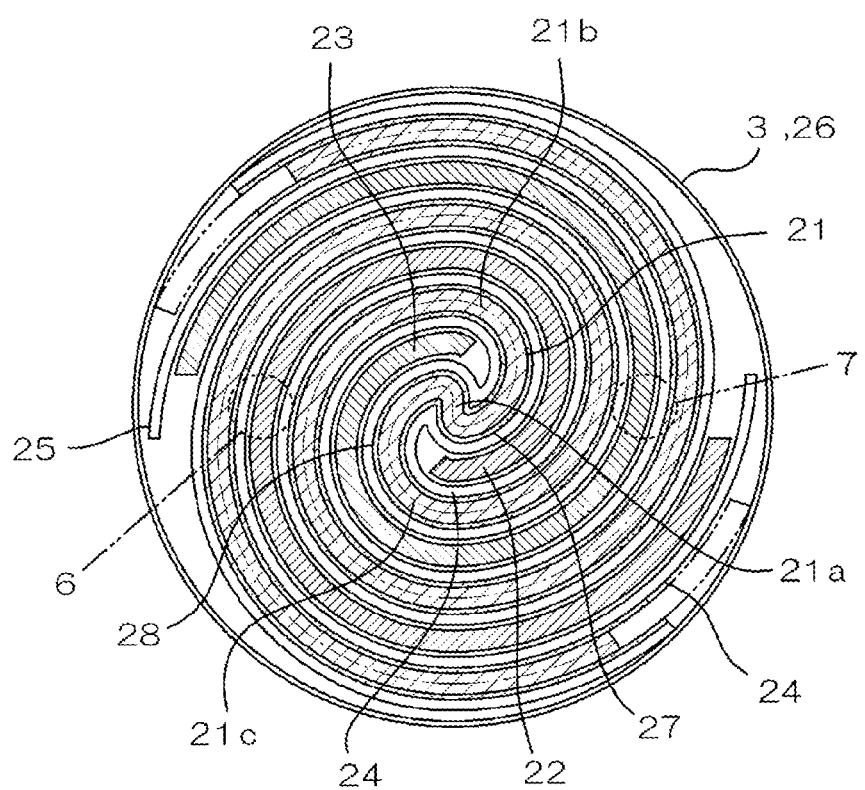
FIG. 12 is a schematic sectional view schematically illustrating a cross-section structure of a winding structure according to a fourth embodiment.

As indicated by alternate long and two dashed lines in FIG. 12, by causing outer edge portions (side edges) of the intermediate electrode body 20 to protrude outward in the axial direction of the winding structure 20, and/or by disposing outer edge portions (end edges) outward in the radial direction of the winding structure 20, the leakage current can be reduced and the insulation performance can be improved. In these cases, it is further preferable that the outer edge portions are brought into contact with outer boundaries (the above-described inner surface, etc.) of the accommodation space for the winding structure 20 in the axial direction and/or the radial direction.

Fifth Embodiment

Next, an electrical storage device according to a fifth embodiment of the present invention will be described with reference to FIG. 13. In this embodiment, components other than an intermediate electrode body 31 (an intermediate portion 31a, a first extending portion 31b, and a second extending portion 31c) can be configured in the same manner as in the first to fourth embodiments, so that portions which can be configured in the same manner are provided with the same reference signs, and description thereof will be omitted. The intermediate electrode body 31 according to the present embodiment is configured by a plurality of electrode body layers 31h and 31i disposed in a thickness direction via a separator layer 31g therebetween. Although the two electrode body layers 31h and 31i are disposed inward and outward via one separator layer 31g in the illustrated example, three or more electrode body layers may be respectively disposed via separator layers therebetween. With this configuration, the intermediate electrode body 31 is configured by a plurality of electrode bodies, so that one or more electrical storage functional units (third electrical storage functional units) can be configured by only one intermediate electrode body 31, and a higher voltage can be realized. Here, the separator layer 31g can be made of the same material as the first separator 24 and the second separator 25.

Figure 13:
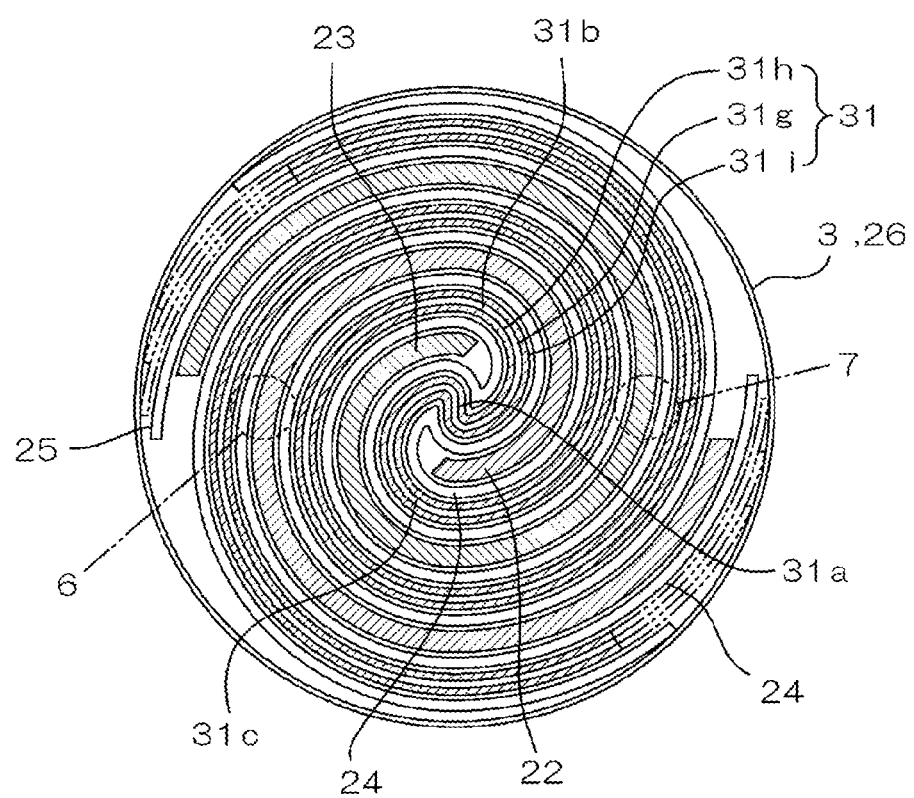
FIG. 13 is a schematic sectional view schematically illustrating a cross-section structure of a winding structure according to a fifth embodiment.

As indicated by alternate long and two short dashed lines in FIG. 13, by causing outer edge portions (side edges) of the intermediate electrode body 20 to protrude outward in the axial direction of the winding structure 20, and/or by disposing outer edge portions (end edges) outward in the radial direction of the winding structure 20, the leakage current can be reduced and the insulation performance can be improved. In these cases, it is further preferable that the outer edge portions are brought into contact with outer boundaries (the above-described inner surface, etc.) of the accommodation space for the winding structure 20 in the axial direction and/or the radial direction. At this time, it is preferable that the plurality of electrode body layers 31h and 31i are respectively extended to the outer circumference of the winding structure 30 via the separator layer 31g, and the separator layer 31g and the electrode body layers 31h and 31i are configured in a terraced form so that each layer comes into contact with a boundary (the above-described inner surface, etc.) of the accommodation space.

Sixth Embodiment

Figure 14:
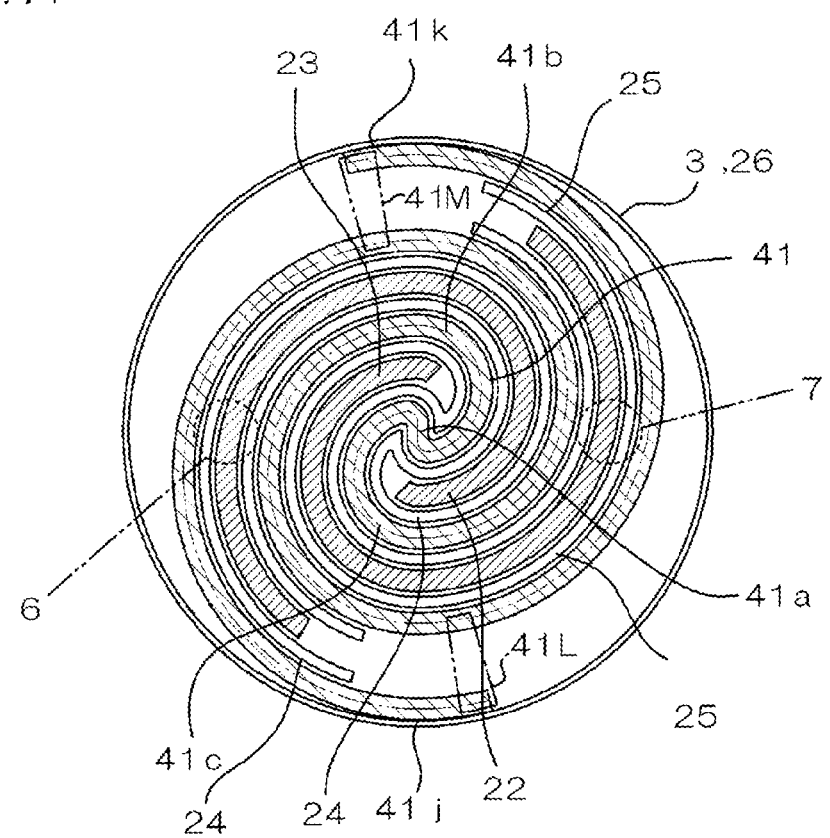
FIG. 14 is a schematic sectional view schematically illustrating a cross-section structure of a winding structure according to a sixth embodiment.

Next, an electrical storage device according to a sixth embodiment of the present invention will be described with reference to FIG. 14. In this embodiment, components other than an intermediate electrode body 41 (an intermediate portion 41a, a first extending portion 41b, and a second extending portion 41c) can be configured in the same manner as in the first to fifth embodiments, so that portions which can be configured in the same manner are provided with the same reference signs, and description thereof will be omitted. In the present embodiment, as illustrated in FIG. 14, the first electrode body 22 and the second electrode body 23 are respectively structured to be covered by outer circumferential portions 41j and 41k of the intermediate electrode body 41 via the first separator 24 and the second separator 25 from outer circumferential sides in a radial direction. That is, the outer circumferential portions 41j and 41k of the first extending portion 41b and the second extending portion 41c are formed over wider angle ranges at outer circumferential sides than the outer circumferential portions of the first electrode body 22 and the second electrode body 23. In this structure, the first electrode body 22 and the second electrode body 23 are surrounded by the intermediate electrode body 41 over the entire periphery (entire angle ranges) as viewed in the radial direction. Accordingly, electrical leakage beyond the intermediate electrode body 41 between the first electrode body 22 and the second electrode body 23 can be suppressed, so that the insulation performance can be further improved. In particular, as in the illustrated example, it is preferable that the outer circumferential portions 41j and 41k of the intermediate electrode body 41 are in contact with boundaries (the above-described inner surface, etc.) of the accommodation space. Along with or instead of the configuration described above, when a configuration is employed in which, in ranges 41L and 41M enclosed by the illustrated alternate long and two short dashed lines, (for example, end portions of) the outer circumferential portions 41j and 41k of the intermediate electrode body 41 and halfway portions of the intermediate electrode body 41 disposed inward of the outer circumferential portions 41j and 41k in a radial direction are (held or attached) in contact with each other, an effect to confine the electrolyte 5 to the inside of the winding structure can be strengthened, so that the insulation performance can be further improved.

In this case, to ensure insulation between the electrodes, as in the illustrated example, it is preferable that the outer circumferential portions of the first separator 24 and the second separator 25 are interposed between the electrode bodies and the intermediate electrode body 41 across wider angle ranges at the outer circumferential sides than the first electrode body 22 and the second electrode body 23. To ensure insulation of the intermediate electrode body 41, a configuration may be made in which the outer circumferential portions of the first separator 24 and the second separator 25 are extended further to the outer circumferential sides than the intermediate electrode body 41 in wider angle ranges, or the insulation may be ensured by the boundary (the above-described inner surface, etc.) of the accommodation space.

Seventh Embodiment

Figure 15:
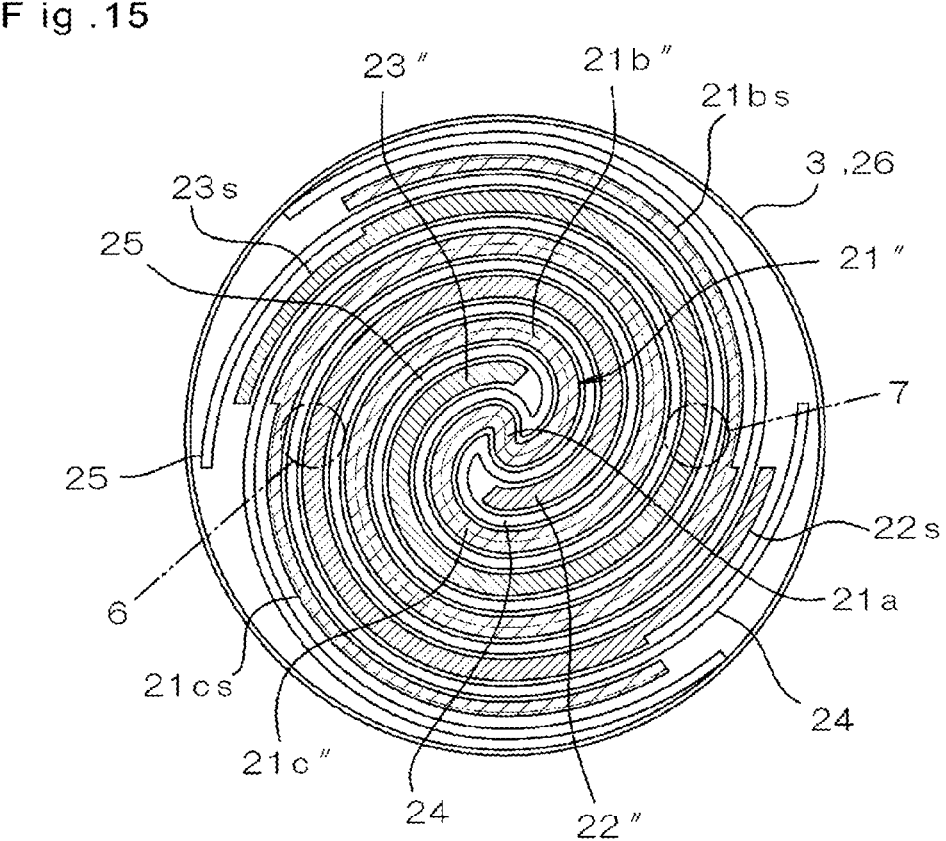
FIG. 15 is a schematic sectional view schematically illustrating a cross-section structure of a winding structure according to a seventh embodiment.

Next, an electrical storage device according to a seventh embodiment of the present invention will be described with reference to FIG. 15. In this embodiment, components other than an intermediate electrode body 21" (an intermediate portion 21a, a first extending portion 21b", and a second extending portion 21c"), a first electrode body 22", and a second electrode body 23" can be configured in the same manner as in the first to sixth embodiments described above, so that portions which can be configured in the same manner are provided with the same reference signs, and description thereof will be omitted. In the present embodiment, as illustrated in FIG. 15, on the first extending portion 21b" and the second extending portion 21c" of the intermediate electrode body 21", by not forming the polarizable electrode layers on surfaces at outer circumferential sides not facing the first electrode body 22" and the second electrode body 23" in angle ranges at the outermost circumference in an outer circumferential portion of the winding structure, outer circumferential exposed regions 21bs and 21cs in which the current collector 211 is exposed are provided. On the first electrode body 22", in an angle range at the outermost circumference in the outer circumferential portion of the winding structure, by not forming the polarizable electrode layer on a surface at an outer circumferential side not facing the intermediate electrode body 21", an outer circumferential exposed region 22s in which the current collector 221 is exposed is provided. Further, on the second electrode body 23", in an angle range at the outermost circumference in the outer circumferential portion of the winding structure, by not forming the polarizable electrode layer on a surface at an outer circumferential side not facing the intermediate electrode body 21", an outer circumferential exposed region 23s in which the current collector 231 is exposed is provided.

With the configuration described above, in the respective electrode bodies 21", 22", and 23", deterioration in durability and variation in durability on the front and back surfaces caused by the presence of the polarizable electrode layers facing the electrodes and the presence of polarizable electrode layers not facing the electrodes on the front and back surfaces, can be suppressed. That is, in the present embodiment, polarizable electrode layers are not formed at portions on the respective electrode bodies 21", 22", and 23" not facing other electrode bodies, so that problems caused by deterioration in durability can be avoided. It is also possible that, to prevent portions where the intermediate electrode body 21" does not face the first electrode body 22" and the second electrode body 23" from being provided at the outer circumferential portion of the winding structure, end portions of both electrode bodies may be set at the same angular position. For example, when outer circumferential end portions of the first electrode body 22" and the second electrode body 23" are aligned with angular positions of outer circumferential end portions of the first extending portion 21b" and the second extending portion 21c" of the intermediate electrode body 21", it is unnecessary to provide the above-described outer circumferential exposed regions on the first electrode body 22" and the second electrode body 23", and it is only necessary to form the outer circumferential regions 21bs and 21cs only on the first extending portion 21b" and the second extending portion 21c".

Eighth Embodiment

Figure 16:
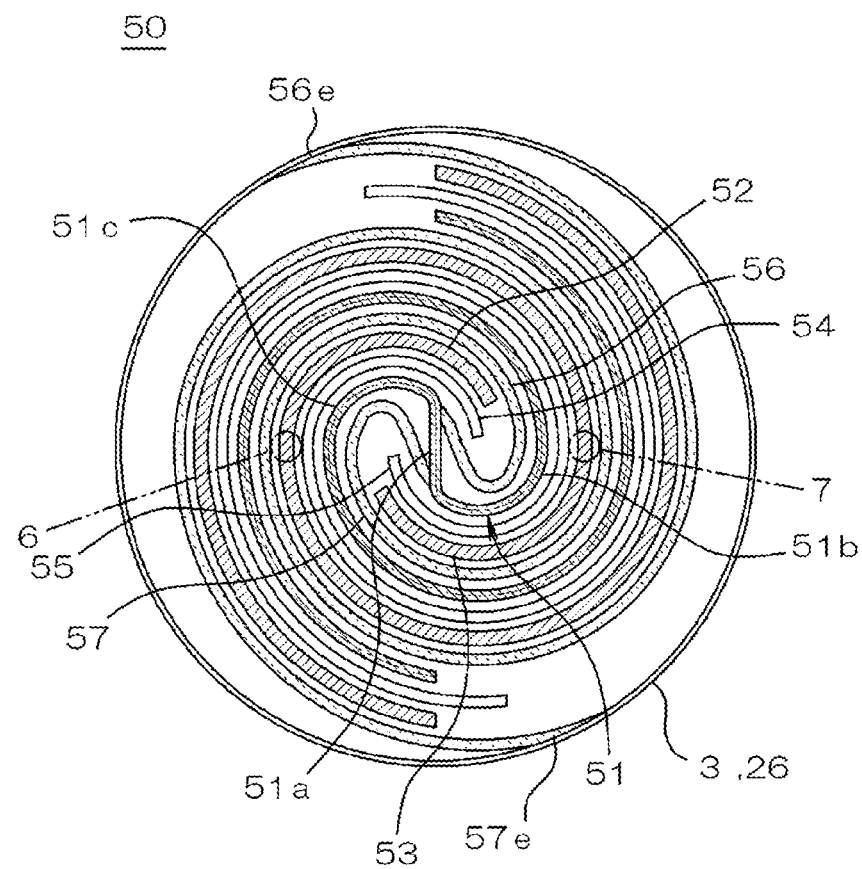
FIG. 16(a) is a schematic sectional view schematically illustrating a cross-section structure of a winding structure according to an eighth embodiment.
FIG. 16(b) is an explanatory view schematically illustrating an entire configuration before winding.
Figure 16:
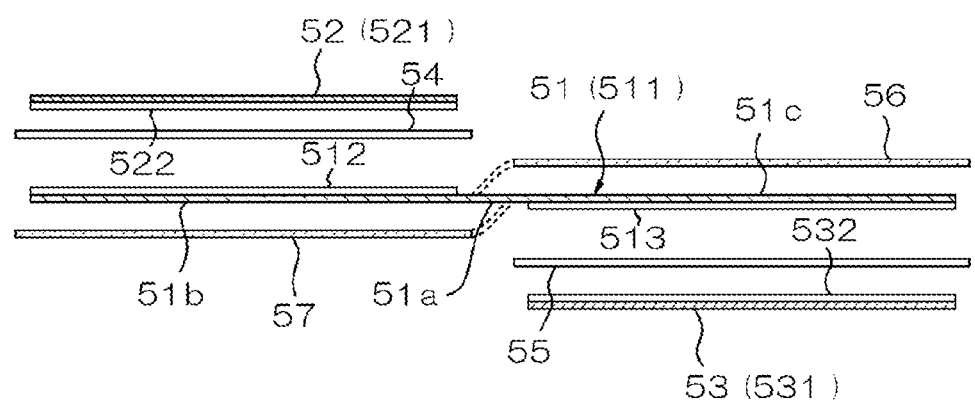

Next, an electrical storage device according to an eighth embodiment of the present invention will be described with reference to FIG. 16. Although this embodiment is different from the above-described embodiments in that partition members 56 and 57 are disposed in portions of an internal structure of a winding structure 50, other components can be formed in the same manner as in the embodiments described above and configurations related to the description of the embodiments, so that description of portions which can be configured in the same manner as long as they do not pose a problem will be omitted. In the winding structure 50 according to the present embodiment, as illustrated in FIG. 16(a), components which can be configured in the same manner as in the embodiments described above include an intermediate electrode body 51 (an intermediate portion 51a, a first extending portion 51b, and a second extending portion 51c), a first electrode body 52, a second electrode body 53, a first separator 54, a second separator 55, the container 3, the retaining member 26, the sealing body 4 (not illustrated), the electrolyte 5 (not illustrated), the first external electrode 6 and the second external electrode 7.

However, in the present embodiment, whereas the first separator 54 is disposed between the first electrode body 52 and the second extending portion 51c similarly to the first separator 24 according to the embodiments described above, the first separator 54 is not disposed between the first electrode body 52 and the first extending portion 51b unlike the first separator 24 according to the embodiments described above. In addition, whereas the second separator 55 is disposed between the second electrode body 53 and the first extending portion 51b similarly to the second separator 25 according to the embodiments described above, the second separator 55 is not disposed between the second electrode body 53 and the second extending portion 51c unlike the second separator 25 according to the embodiments described above.

The present embodiment is characterized in that, in the winding structure 50, the partition member 56 is disposed so as to be interposed between the first electrode body 52 and the first extending portion 51b, and the partition member 57 is disposed so as to be interposed between the second electrode body 53 and the second extending portion 51c. These partition members 56 and 57 are disposed in ones of inner and outer gaps in a radial direction between the intermediate electrode body 51 and the first electrode body 52 or between the intermediate electrode body 51 and the second electrode body 53 (in the illustrated example, both of the ones are gaps on outer circumferential sides in the radial direction), and the partition members 56 and 57 function as electrically insulating barriers so that a region in which electrodes face each other is configured only in the other gaps between the intermediate electrode body 51 and the first electrode body 52 or second electrode body 53. Therefore, the partition members 56 and 57 are configured by using a material and a shape (structure) which minimize the leakage current between the intermediate electrode body 51 and the first electrode body 52 or between the intermediate electrode body 51 and the second electrode body 53 in the one gaps and ensure voltage resistance. Therefore, it is preferable that the partition members 56 and 57 have electrolyte barrier properties and electrical insulating properties. That is, the partition members 56 and 57 have barrier properties which do not allow the electrolyte (ions) to pass through, and the partition members themselves have electric insulating properties. It is preferable that the partition members 56 and 57 are made of a synthetic resin. The synthetic resin is, for example, polyphenylene sulfide (PPS), polyimide (PI), aramid (wholly aromatic polyamide), polyether ether ketone (PEEK), polyethylene terephthalate (PET), polytetrafluoroethylene (PTFE), polypropylene (PP), polyethylene (PE), etc.

In addition, it is preferable that the partition members 56 and 57 are sheet-shaped as a form preferable for constituting the winding structure 50. Further, it is preferable that, when the electrolyte is introduced into the winding structure, the partition members do not allow the electrolyte and ions of the electrolyte to pass through. In particular, it is preferable that the partition members have impermeability and non-retainability of the electrolyte and ions of the electrolyte. For example, the partition members are made of sheet materials having no voids. Accordingly, it becomes possible to further reliably reduce the leakage current through the electrolyte, and the insulation performance of the device can be further improved. Synthetic resin-made sheet materials preferable in these respects are fluororesin sheets of polytetrafluoroethylene (PTFE), perfluoroalkoxyalkane (PFA), perfluoroethylene propane copolymer (FEP), polyvinylidene fluoride (PVDF), ethylene tetrafluoroethylene copolymer (ETFE), and polychlorotrifluoroethylene (PCTFE), etc.

As will be described later, when an electrolyte having a high fluidity such as an electrolytic solution is used, it is preferable that the partition members 56 and 57 have surfaces with properties which repel the electrolyte. As a surface material in this case, for example, the above-described fluororesin sheet may be preferably used. It is also possible that a surface layer with properties which repel the electrolyte is formed by coating on the surface. As for the degree of repelling the electrolyte, a contact angle θ of 80 degrees or more to a target electrolyte (solution) is preferable, and an angle (obtuse angle) exceeding 90 degrees is particularly preferable. Normally, the contact angle of fluororesin is approximately 100 degrees. In this way, due to the surfaces of the partition members 56 and 57 formed to be small in wettability with the electrolyte, even when there are slight gaps between the partition members 56 and 57 and peripheral members, the electrolyte is less likely to get beyond the accommodation region (less likely to pass through the gaps) partitioned by the partition members 56 and 57, so that an effect of improving the insulation performance such as reduction in leakage current can be obtained.

The partition members 56 and 57 are formed of sheets which have no voids and have electric insulation as described above. When the partition members 56 and 57 are formed of synthetic resin-made sheets as described above, in order to make the configuration as compact as possible while securing electric insulation and electrolyte (ion) impermeability, thicknesses of the sheets are preferably within a range of 5 μm to 1 mm, and particularly preferably within a range of 10 μm to 500 μm. In particular, the thicknesses are further preferably within a range of 20 μm to 200 μm. Thicknesses smaller than the respective ranges cause the electrolyte and ions of the electrolyte to easily pass through, and thicknesses larger than the respective ranges deteriorate winding performance during manufacturing, and are disadvantageous for realizing compactness of the electrical storage device.

Now, in the present embodiment, as described above, the intermediate electrode body 51, the first electrode body 52, and the second electrode body 53 can also be configured by laminated structures of the current collectors 511, 521, and 531 and the polarizable electrode layers 512, 513, 522, and 532. However, in the present embodiment, as described above, since the partition member 56 is interposed between the first electrode body 52 and the first extending portion 51b, and the partition member 57 is interposed between the second electrode body 53 and the second extending portion 51c, as illustrated in FIG. 16(b), facing regions in which the intermediate electrode body 51 face the first electrode body 52 and the second electrode body 53 and which perform an electrical storage function are only on the sides where the first separator 54 and the second separator 55 are interposed (in the illustrated example, the inner circumferential sides), and no facing regions which perform an electrical storage function are configured on the sides where the partition members 56 and 57 are interposed (in the illustrated example, the outer circumferential sides). This indicates that, in the present embodiment, the polarizable electrode layers 512, 513, 522, and 532 are formed as laminations only on the facing region sides, and no polarizable electrode layers are formed on the partition member 56, 57 sides. Accordingly, non-facing regions of polarizable electrode layers can be reduced, and deterioration in durability and variation in durability on the front and back surfaces caused by the non-facing region can be suppressed.

According to the present embodiment, by providing the electrically insulating partition members 56 and 57 with electrolyte barrier properties in ones of two gaps between the intermediate electrode body 51 and the first electrode body 52 and between the intermediate electrode body 51 and the second electrode body 53, electrical leakage between two electrical storage structural units provided and connected in series in the winding structure 50 can be reduced. In particular, when the electrolyte 5 is held to be included in the winding structure 50 as in the present embodiment, electrical short-circuiting through the electrolyte 5 can be suppressed, and the leakage current can be reduced, so that the voltage resistance can be improved. In particular, as in the present embodiment, both of the partition members 56 and 57 are disposed in gaps on the same inner or outer one sides (in the illustrated example, outer circumferential sides) in the radial direction of the gaps between the intermediate electrode body 51 and the first electrode body 52 and between the intermediate electrode body 51 and the second electrode body 53, structural and functional imbalance between the electrical storage functional unit configured between the intermediate electrode body and the first electrode body 52 and the electrical storage functional unit configured between the intermediate electrode body and the second electrode body 53 can be reduced, and symmetry of the electrical storage functional units can be improved as in the illustrated example.

It is preferable that outer edge portions (side edges) of the partition members 56 and 57 according to the present embodiment are respectively positioned further outward than the intermediate electrode body 51 and at least one of (preferably, both of) the first electrode body 52 and the second electrode body 53 in the axial direction of the winding structure 50 from a viewpoint of an improvement in insulation performance. Particularly preferably, both outer edge portions (both side edges) of the partition members 56 and 57 in the axial direction are respectively positioned to be protruded further outward than the intermediate electrode body 51 and at least one of (preferably, both of) the first electrode body 52 and the second electrode body 53 in the axial direction of the winding structure 50. When the winding structure 50 is accommodated in an accommodation space configured by a housing formed of the container 3 and the sealing body 4 and the retaining member 26 inside the housing, the outer edge portions (side edges) described above are preferably brought into contact with (fixed to) outer boundaries of the accommodation space in the axial direction.

In addition, from a viewpoint of an improvement in insulation performance, it is preferable that outer edge portions (end edges) 56e and 57e of the partition members 56 and 57 are positioned to be protruded further outward than the intermediate electrode body 51 and at least one of (preferably, both of) the first electrode body 52 and the second electrode body 53 in a radial direction of the winding structure 50. As in the illustrated example, it is preferable that outer edge portions (outer end edges) of the intermediate electrode body 51, the first electrode body 52 or the second electrode body 53 are structured to be covered by outer circumferential portions (portions extending to the end edges 56e and 57e) of the partition members 56 and 57 from the outer circumferential sides. Further, it is preferable that, when the winding structure 50 is accommodated in an accommodation space configured by a housing formed of the container 3 and the sealing body 4 and the retaining member 26 inside the housing, the outer edge portions (end edges in a radial direction) 56e and 57e are in contact with (further preferably, fixed to) outer boundaries of the accommodation space in the radial direction. Further, from a viewpoint of an improvement in insulation performance, it is also preferable that inner edge portions (inner end edges) of the partition members 56 and 57 in the radial direction are disposed to extend further to inner circumferential sides of the winding structure 50 than the first electrode body 52 or the second electrode body 53. It is also preferable that inner edge portions (inner end edges) of the intermediate electrode body 51, the first electrode body 52 or the second electrode body 53 are covered by inner edge portions of the partition members 56 and 57 from the inner circumferential sides. In particular, as illustrated in FIG. 16(a), for a further improvement in insulation performance, it is preferable that the inner edge portions of the partition members 56 and 57 are respectively in contact with (further preferably, connected and fixed to) an inner circumferential portion such as the intermediate portion 51a of the intermediate electrode body 51. It is also possible that the inner edge portions of the partition members 56 and 57 are respectively in contact with (further preferably, connected and fixed to) inner circumferential portions of the first separator 54 and the second separator 55. However, the inner edge portions of the partition members 56 and 57 are allowed to be separated from the intermediate electrode body 51 and the separators 54 and 55 as indicated by dotted lines in FIG. 16(b).

In the present embodiment, it is preferable that in winding structure 50, outer circumferential portions of the intermediate electrode body 51, the first electrode body 52, and the second electrode body 53 are structured to be covered by outer circumferential portions (portions leading to the end edges 56e and 57e in a radial direction) of the partition members 56 and 57 from the outer circumferential sides in the radial direction as in the illustrated example. It is preferable that, regardless of the outer circumferential portions of the partition members 56 and 57, outer circumferential portions of the first separator 54 and the second separator 55 extend further to outer circumferential sides than the outer circumferential portions of the intermediate electrode body 51, the first electrode body 52, and the second electrode body 53.

The retaining member 26 is preferably formed not to disturb electric insulation by its adhesive layer and not to connect the respective electrode bodies (particularly, polarizable electrode layers) and separators through the adhesive layer between regions partitioned by the partition members 56 and 57.

Ninth Embodiment

Figure 17:
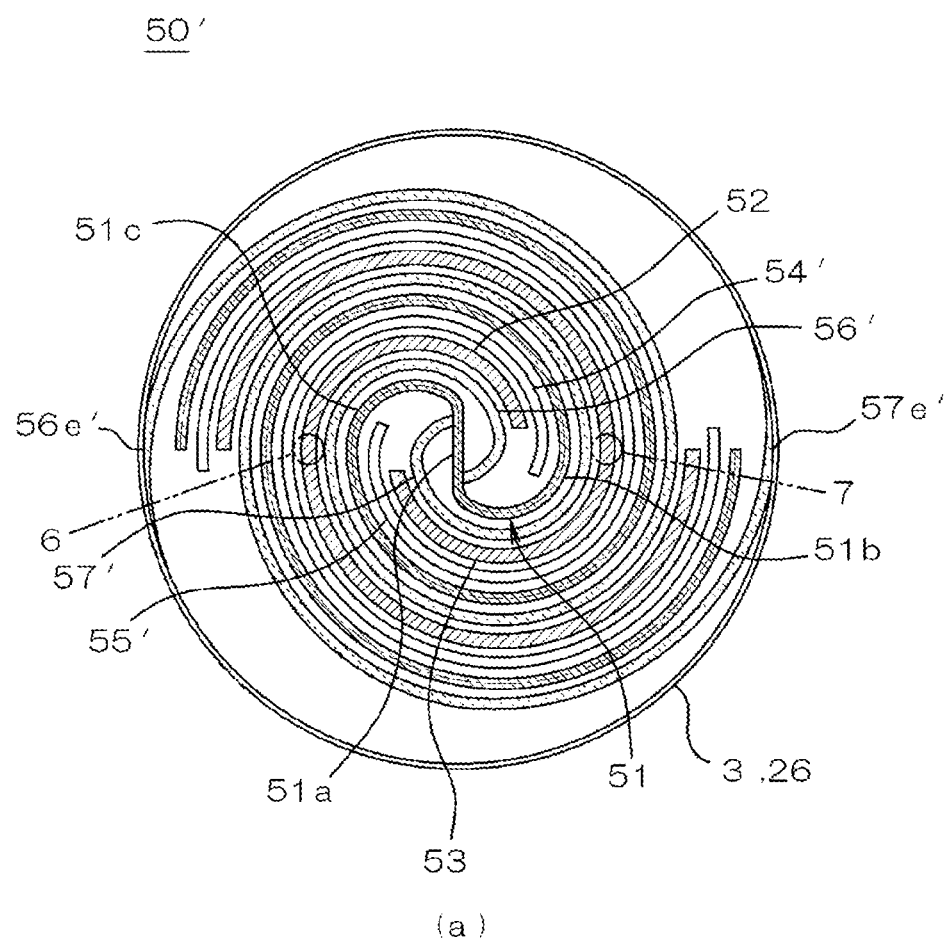
FIG. 17(a) is a schematic sectional view schematically illustrating a cross-section structure of a winding structure according to a ninth embodiment.
FIG. 17(b) is an explanatory view schematically illustrating an entire configuration before winding.
Figure 17:
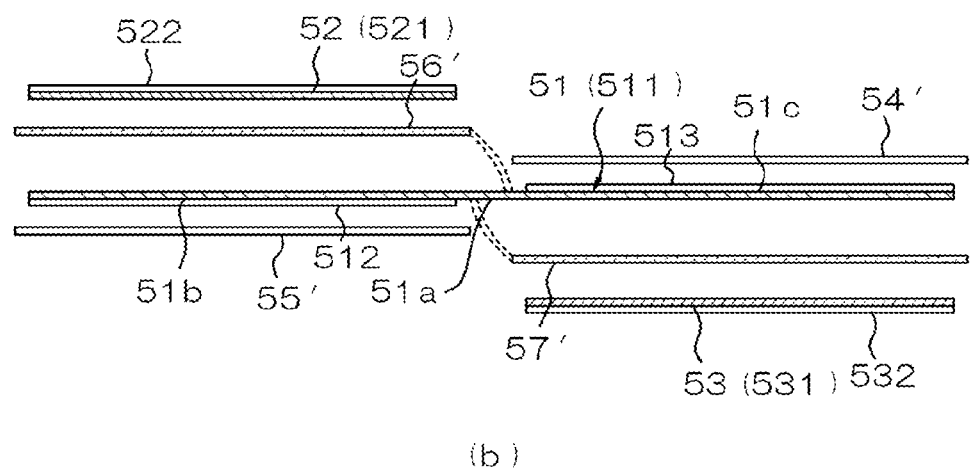

Next, an electrical storage device according to a ninth embodiment of the present invention will be described with reference to FIG. 17. In this embodiment, although partition members 56' and 57' are disposed in portions of an internal structure of a winding structure 50' as in the eighth embodiment, this embodiment is different from the eighth embodiment in the following respect. That is, in the present embodiment, the partition member 56' is disposed between the first electrode body 52 and the second extending portion 51c, and the partition member 57' is disposed between the second electrode body 53 and the first extending portion 51b. On the other hand, a first separator 54' is disposed between the first electrode body 52 and the first extending portion 51b, and a second separator 55' is disposed between the second electrode body 53 and the second extending portion 51c. In this embodiment, the partition members 56' and 57' are respectively disposed in gaps on inner circumferential sides of pairs of inner and outer gaps in a radial direction between the intermediate electrode body 51 and the first electrode body 52 or between the intermediate electrode body 51 and the second electrode body 53.

In other configurations, the partition members 56' and 57' can be configured in the same manner as in the eighth embodiment described above, and it is clear that the same configuration can be employed as long as it does not pose a problem, so that description of these will be omitted. The winding structure 50' according to the present embodiment can also bring about the same operation and effect as those of the eighth embodiment. Further, concerning laminations of the polarizable electrode layers 512, 513, 521, and 531 on the current collectors 511, 521, and 531 illustrated in FIG. 17(b), the point that polarizable electrode layers are formed at portions where the electrodes face each other via the first separator 54' and the second separator 55', and a configuration and an operation and effect in a case where non-facing portions of polarizable electrode layers are not formed, are the same as in the eighth embodiment.

INDUSTRIAL APPLICABILITY

As a matter of course, an electrical storage device according to the present invention is not limited to only the illustrated examples described above, and can be variously modified without departing from the scope of the present invention. For example, although examples of electrical double layer capacitors are described in the respective embodiments above, it is obvious to a person skilled in the art that the internal electrode structure of the winding structure described above can be easily applied to electrolytic capacitors by forming insulation films such as oxide coatings on the surfaces of the respective electrodes. The internal electrode structure according to the present invention is also applicable to various capacitor-type electrical storage devices including other various types of capacitors. Further, the internal electrode structure according to the present invention is also applicable to chemical electrical storage devices such as a battery. The configurations of the components of the respective embodiments can be arbitrarily combined with each other as long as the combination poses no problem.

In this specification, whereas an example of an induction-type electrical storage device in which lead wires (first external terminal and second external terminal) are attached to internal electrodes (first electrode body and second electrode body) and the electrode bodies are wound is illustrated as an embodiment and described, an electrical storage device according to the present invention is not limited to the induction type, and can also be configured as a non-inductive electrical storage device in which lead wires (first external terminal and second external terminal) are attached to end edge portions of internal electrodes (first electrode body and second electrode body) in an axial direction of the winding structure.

In the electrical storage device according to the present invention, as described above, two electrical storage functional units including a first electrical storage functional unit configured by the intermediate electrode body 21 and the first electrode body 22 and a second electrical storage functional unit configured by the intermediate electrode body 21 and the second electrode body 23 are configured in series via the intermediate electrode body 21. In this case, by using an anisotropic ion conductor having high ion conductivity in a thickness direction and low ion conductivity in a planar direction as the electrolyte 5, problems caused by a common electrolyte effect such as generation of a self-discharge current through short-circuit between the electrical storage functional units through the electrolyte 5 can be reduced, so that electrical leakage in the embodiment described above can be further reduced. The anisotropic ion conductor needs to have smaller electric conductivity in a direction along a surface of each electrode body than electric conductivity in a direction perpendicular to the surface of each electrode body, and an anisotropic ion conductor whose electric conductivity in a direction along the surface of each electrode body is 10% or less of electric conductivity in a direction perpendicular to the surface of each electrode body is particularly preferably used.

REFERENCE SIGNS LIST

1: electrical storage device (electrical double layer capacitor), 2: winding type capacitor element, 3: container (case), 4: sealing body, 5: electrolyte, 6: first external terminal, 7: second external terminal, 20, 50: winding structure, 21, 21', 31, 41, 51: intermediate electrode body, 21a, 31a, 41a, 51a: intermediate portion, 21b, 31b, 41b, 51b: first extending portion, 21c, 31c, 41c, 51c: second extending portion, 21d: outer edge portion, 21e: end edge, 21f: side edge, 31g: separator layer, 31h, 31i: electrode body layer, 41j, 41k: outer circumferential portion, 22, 52: first electrode body, 23, 53: second electrode body, 24, 54, 54': first separator, 25, 55, 55': second separator, 26: retaining member, 27, 28: adhesive layer, 211, 221, 231, 511, 521, 531: current collector, 212, 213, 222, 223, 232, 233, 512, 513, 522, 532: polarizable electrode layer, 56, 57, 56', 57': partition member

The invention claimed is:

1. An electrical storage device comprising:
a winding structure, and
a first external terminal and a second external terminal connected to the winding structure, wherein
the winding structure includes:
a band-shaped intermediate electrode body which has a first extending portion and a second extending portion extending from an intermediate portion in an extending direction to both sides of the intermediate portion and being wound around the intermediate portion in the same direction,
a first electrode body which is conductively connected to the first external terminal, and which is disposed between the first extending portion positioned at an inner circumferential side and the second extending portion positioned at an outer circumferential side, and which extends s from the vicinity of intermediate portion toward the outer circumferential side,
a second electrode body which is conductively connected to the second external terminal and which disposed between the second extending portion positioned at an inner circumferential side and the first extending portion positioned at an outer circumferential side, and which extends from the vicinity of the intermediate portion toward the outer circumferential side,
a first separator disposed between the intermediate electrode body and the first electrode body, and
a second separator disposed between the intermediate electrode body and the second electrode body, wherein
an outer edge portion of the intermediate electrode body protrudes further outward than the first electrode body and the second electrode body in the winding structure in an axial direction of the winding structure, and
the outer edge portion of the intermediate electrode body is disposed further outward than the first electrode and second electrode body in the winding structure in a radial direction of the winding structure.

2. The electrical storage device according to claim 1, wherein
the outer edge portion of the intermediate electrode body has insulation.

3. The electrical storage device according to claim 1, wherein
an electrolyte is introduced into the winding structure, and
the outer edge portion of the intermediate electrode body is made more difficult to retain the electrolyte or ions of the electrolyte or is made more difficult to pass through the electrolyte or ions of the electrolyte than a main body portion of the intermediate electrode body.

4. An electrical storage device comprising:
a winding structure, and
a first external terminal and a second external terminal connected to the winding structure, wherein
the winding structure includes:
a band-shaped intermediate electrode body which has a first extending portion and a second extending portion extending from an intermediate portion in an extending direction to both sides of the intermediate portion and being wound around the intermediate portion in the same direction,
a first electrode body which is conductively connected to the first external terminal, and which is disposed between the first extending portion positioned at an inner circumferential side and the second extending portion positioned at an outer circumferential side, and which extends from the vicinity of intermediate portion toward the outer circumferential side,
a second electrode body which is conductively connected to the second external terminal and which disposed between the second extending portion positioned at an inner circumferential side and the first extending portion positioned at an outer circumferential side, and which extends from the vicinity of the intermediate portion toward the outer circumferential side, a first separator disposed between the intermediate electrode body and the first electrode body, and a second separator disposed between the intermediate electrode body and the second electrode body, wherein an outer edge portion of the intermediate electrode body protrudes further outward than the first electrode body and the second electrode body in the winding structure in an axial direction of the winding structure.

5. The electrical storage device according to claim 4, wherein the winding structure is disposed inside an accommodation space, and the outer edge portion of the intermediate electrode body is in contact with an outer boundary of the accommodation space for the winding structure in the axial direction.

6. The electrical storage device according to claim 4, wherein an outer edge portion of the intermediate electrode body is disposed further outward than the first electrode and second electrode body in the winding structure in a radial direction of the winding structure.

7. The electrical storage device according to claim 6, wherein the winding structure is disposed inside an accommodation space, and the outer edge portion of the intermediate electrode body is in contact with an outer boundary of the accommodation space for the winding structure in the radial direction.

8. The electrical storage device according to claim 4, wherein the outer edge portion of the intermediate electrode body has insulation.

9. The electrical storage device according to claim 4, wherein an electrolyte is introduced into the winding structure, and the outer edge portion of the intermediate electrode body is made more difficult to retain the electrolyte or ions of the electrolyte or is made more difficult to pass through the electrolyte or ions of the electrolyte than a main body portion of the intermediate electrode body.

10. The electrical storage device according to claim 4, wherein the winding structure is structured SO that outer circumferential portions of the first electrode body and the second electrode body are covered by outer circumferential portions of the intermediate electrode body from outer circumferential sides in a radial direction.

11. The electrical storage device according to claim 10, wherein the outer circumferential portions of the first separator and the second separator are present over wider angle ranges on outer circumferential sides in the radial direction than the first electrode body and the second electrode body.

12. An electrical storage device comprising:
a winding structure, and
a first external terminal and a second external terminal connected to the winding structure, wherein
the winding structure includes:
a band-shaped intermediate electrode body which has a first extending portion and a second extending portion extending from an intermediate portion in an extending direction to both sides of the intermediate portion and being wound around the intermediate portion in the same direction,
a first electrode body which is conductively connected to the first external terminal, and which is disposed between the first extending portion positioned at an inner circumferential side and the second extending portion positioned at an outer circumferential side, and which extends from the vicinity of intermediate portion toward the outer circumferential side, a second electrode body which is conductively connected to the second external terminal and which disposed between the second extending portion positioned at an inner circumferential side and the first extending portion positioned at an outer circumferential side, and which extends from the vicinity of the intermediate portion toward the outer circumferential side, a first separator disposed between the intermediate electrode body and the first electrode body, and a second separator disposed between the intermediate electrode body and the second electrode body, wherein the first separator is disposed in one of a pair of inner and outer gaps in a radial direction between the intermediate electrode body and the first electrode body which are respectively provided inward and outward in the radial direction, an electrically insulating first partition member with electrolyte barrier properties is disposed in the other gap, the second separator is disposed in one of a pair of inner and outer gaps in a radial direction between the intermediate electrode and the second electrode body which are respectively provided inward and outward in the radial direction, and an electrically insulating second partition member with electrolyte barrier properties is disposed in the other gap.

13. The electrical storage device according to claim 12, wherein the first partition member is disposed in a gap at one side of the inner side and the outer side in the radial direction, and the second partition member is disposed in a gap at the same one side as the first partition member.

14. The electrical storage device according to claim 12, wherein an electrolyte is introduced into the winding structure, and the first partition member and the second partition member have impermeability and non-retainability of the electrolyte and ions of the electrolyte.

15. The electrical storage device according to claim 14, wherein the electrolyte is in liquid form, and the first partition member and the second partition member have a surface having a contact angle of 80 degrees or more to the electrolyte.

16. The electrical storage device according to claim 12, wherein the outer edge portions of the first partition member and the second partition member respectively protrude further than the intermediate electrode and at least one of the first electrode body and the second electrode body in an axial direction of the winding structure.

17. The electrical storage device according to claim 16, wherein the winding structure disposed in an accommodation space, and the outer edge portions of the first partition member and the second partition member are respectively in contact with outer boundaries of the accommodation space in the axial direction.

18. The electrical storage device according to claim 12, wherein outer edge portions of the first partition member and the second partition member are respectively disposed further outward than the intermediate electrode body and at least one of the first electrode body and second electrode body in the winding structure in a radial direction of the winding structure.

19. The electrical storage device according to claim 18, wherein the winding structure is disposed in an accommodation space, and the outer edge portions of the first partition member and the second partition member are respectively in contact with outer boundaries of the accommodation space in the radial direction.

20. The electrical storage device according to claim 12, wherein an inner edge portion of the first partition member is disposed to extend further to an inner circumferential side than an inner edge portion of the first electrode body, and an inner edge portion of the second partition member is disposed to extend further to an inner circumferential side than an inner edge portion of the second electrode body.

* * * * *